(12) United States Patent
Ishiguro et al.

(10) Patent No.: US 7,325,139 B2
(45) Date of Patent: *Jan. 29, 2008

(54) INFORMATION PROCESSING DEVICE, METHOD, AND PROGRAM

(75) Inventors: Ryuji Ishiguro, Tokyo (JP); Keiko Tada, Kanagawa (JP); Motomasa Futagami, Kanagawa (JP)

(73) Assignee: Sony Corporation, Tokyo (JP)

(*) Notice: Subject to any disclaimer, the term of this patent is extended or adjusted under 35 U.S.C. 154(b) by 796 days.

This patent is subject to a terminal disclaimer.

(21) Appl. No.: 10/480,627

(22) PCT Filed: Apr. 10, 2003

(86) PCT No.: PCT/JP03/04546

§ 371 (c)(1),
(2), (4) Date: Dec. 12, 2003

(87) PCT Pub. No.: WO03/088056

PCT Pub. Date: Oct. 23, 2003

(65) Prior Publication Data

US 2004/0243808 A1 Dec. 2, 2004

(30) Foreign Application Priority Data

Apr. 15, 2002 (JP) .............................. 2002-112109

(51) Int. Cl.
*H04L 9/00* (2006.01)
(52) U.S. Cl. ...................... 713/180; 713/176; 713/168
(58) Field of Classification Search ..................... None
See application file for complete search history.

(56) References Cited

U.S. PATENT DOCUMENTS

| 5,311,591 | A | | 5/1994 | Fischer |
| 5,412,717 | A | | 5/1995 | Fischer |
| 5,745,879 | A | * | 4/1998 | Wyman ......................... 705/1 |
| 5,825,877 | A | | 10/1998 | Dan et al. |
| 6,236,971 | B1 | * | 5/2001 | Stefik et al. ................... 705/1 |

(Continued)

FOREIGN PATENT DOCUMENTS

EP          0 570 123          11/1993

(Continued)

*Primary Examiner*—Nasser Moazzami
*Assistant Examiner*—Pramila Parthasarathy
(74) *Attorney, Agent, or Firm*—Finnegan, Henderson, Farabow, Garrett & Dunner, L.L.P.

(57) ABSTRACT

The present invention relates to an information processing apparatus and method and to a program for reliably preventing unauthorized use of content even in the case of a low-throughput content storage device. A CPU selects content to be stored on a content storage device. In step S202, the CPU verifies a first digital signature added to the content. A storage unit stores a usage right. In step S203, the CPU searches the storage unit for the usage right. In step S207, the CPU verifies a second digital signature added to the usage right. The CPU generates alteration detecting data on the basis of information included in the usage right. In step S208, when the content and the usage right are unaltered, the CPU outputs the usage right, the alteration detecting data, and the content to the content storage device. The present invention is applicable to clients in a DRM system.

8 Claims, 24 Drawing Sheets

U.S. PATENT DOCUMENTS

| | | | | |
|---|---|---|---|---|
| 6,427,140 | B1* | 7/2002 | Ginter et al. | 705/80 |
| 6,976,009 | B2* | 12/2005 | Tadayon et al. | 705/51 |
| 2005/0044046 | A1* | 2/2005 | Ishiguro | 705/57 |
| 2005/0075981 | A1* | 4/2005 | Kawamoto et al. | 705/51 |

FOREIGN PATENT DOCUMENTS

| | | |
|---|---|---|
| EP | 0 813 132 | 12/1997 |
| EP | 1 152 397 | 11/2001 |

\* cited by examiner

FIG. 8

| VERSION |
|---|
| PROFILE |
| USAGE RIGHT ID |
| CREATION DATE |
| EXPIRATION DATE |
| USAGE RULES |
| DIGITAL SIGNATURES OF USAGE RULES |
| CONTENT RULES |
| CONSTANT |
| LEAF ID |
| DIGITAL SIGNATURE |
| CERTIFICATE |

FIG. 13

| VERSION : t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 14

| VERSION : t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

EKB

INFORMATION PROCESSING DEVICE, METHOD, AND PROGRAM

TECHNICAL FIELD

The present invention relates to information processing apparatuses and methods and programs. More particularly, the present invention relates to an information processing apparatus and method and a program for transferring content to another device while protecting the copyright of the content in a copyright management system in which content and a usage right therefor are separately distributed.

BACKGROUND ART

Recently, systems for distributing content, such as music data or image data, to users via the Internet have been realized.

In such known DRM (Digital Rights Management) systems for protecting the copyright of works, the same protection method is used irrespective of the throughput of terminals. In particular, a low-throughput terminal or content storage device has difficulty in preventing unauthorized use of content.

In systems where a usage right and content are separately distributed, a terminal or content storage device has a great burden and difficulty of investigating the authenticity of both the usage right and the content and matching the usage right with the content. For example, it is difficult for a low-throughput terminal to determine whether a device has a usage right associated with content, investigate the authenticity of the usage right and the content, and permit use of the content to the device.

DISCLOSURE OF INVENTION

In view of the above-described circumstances, it is an object of the present invention to enable even a low-throughput content storage device to use content and to reliably prevent unauthorized use of content.

An information processing apparatus of the present invention includes first selection means for selecting content to be stored on a content storage device; first verification means for verifying a first digital signature added to the content selected by the first selection means; storage means for storing a usage right permitting use of the content selected by the first selection means; retrieving means for retrieving, from the storage means, the usage right associated with the content selected by the first selection means; second verification means for verifying a second digital signature added to the usage right retrieved by the retrieving means; first data generating means for generating first alteration detecting data on the basis of information included in the usage right retrieved by the retrieving means; and first output means for outputting the usage right, the first alteration detecting data generated by the first data generating means, and the content to the content storage device upon determination that, on the basis of the verification result by the first verification means and the verification result by the second verification means, the content and the usage right are unaltered.

The information processing apparatus may further include second selection means for selecting, when a plurality of usage rights are retrieved by the retrieving means, a usage right from among the plurality of retrieved usage rights. The second verification means may verify a digital signature added to the usage right selected by the second selection means. The first data generating means may generate the first alteration detecting data on the basis of information included in the usage right selected by the second selection means.

The information processing apparatus may further include conversion means for converting the content selected by the first selection means to a format associated with the content storage device. The first output means may output the content converted by the conversion means to the content storage device.

The information processing apparatus may further include conversion means for converting the usage right associated with the content to a format associated with the content storage device. The first alteration detecting data generated by the first data generating means may be alteration detecting data based on the usage right converted by the conversion means.

The first alteration detecting data generated by the first data generating means may be generated on the basis of a usage rule included in the usage right.

The information processing apparatus may further include obtaining means for obtaining, from the content storage device, the entire first alteration detecting data generated by the first data generating means on the basis of the usage right associated with the content stored on the content storage device; second data generating means for generating second alteration detecting data on the basis of the entire first alteration detecting data obtained by the obtaining means; and second output means for outputting the second alteration detecting data generated by the second data generating means to the content storage device.

An information processing method of the present invention includes a selection step of selecting content to be stored on a content storage device; a first verification step of verifying a first digital signature added to the content selected in the selection step; a storage control step of controlling storage of a usage right permitting use of the content selected in the selection step in storage means; a retrieving step of retrieving, from the storage means, the usage right associated with the content selected in the selection step; a second verification step of verifying a second digital signature added to the usage right retrieved in the retrieving step; a data generating step of generating alteration detecting data on the basis of information included in the usage right retrieved in the retrieving step; and an output step of outputting the usage right, the alteration detecting data generated in the data generating step, and the content to the content storage device upon determination that, on the basis of the verification result by the first verification step and the verification result by the second verification step, the content and the usage right are unaltered.

A program of the present invention causes a computer to perform a process including a selection step of selecting content to be stored on a content storage device; a first verification step of verifying a first digital signature added to the content selected in the selection step; a storage control step of controlling storage of a usage right permitting use of the content selected in the selection step in storage means; a retrieving step of retrieving, from the storage means, the usage right associated with the content selected in the selection step; a second verification step of verifying a second digital signature added to the usage right retrieved in the retrieving step; a data generating step of generating alteration detecting data on the basis of information included in the usage right retrieved in the retrieving step; and an output step of outputting the usage right, the alteration detecting data generated in the data generating step, and the content to the content storage device upon determination that, on the basis of the verification result by the first verification step and the verification result by the second verification step, the content and the usage right are unaltered.

According to an information processing apparatus and method and a program of the present invention, content to be stored on a content storage device is selected; a first digital signature added to the selected content is verified; a usage right permitting use of the selected content is stored; the usage right associated with the selected content is retrieved from storage means; a second digital signature added to the retrieved usage right is verified; on the basis of information included in the retrieved usage right, alteration detecting data is generated; and, upon determination that the content and the usage are unaltered on the basis of the first verification result and the second verification result, the usage right, the alteration detecting data, and the content are output to the content storage device.

Content may include information of any format, such as audio, image, or text, as long as it serves as useful information.

A digital signature may be generated by any method as long as it serves as information for proving authenticity.

BRIEF DESCRIPTION OF THE DRAWINGS

FIG. 8 is an illustration showing the structure of a usage right.

FIG. 13 is an illustration describing the structure of an enabling key block.

FIG. 14 is an illustration describing the structure of an enabling key block.

BEST MODE FOR CARRYING OUT THE INVENTION

Figure 1:
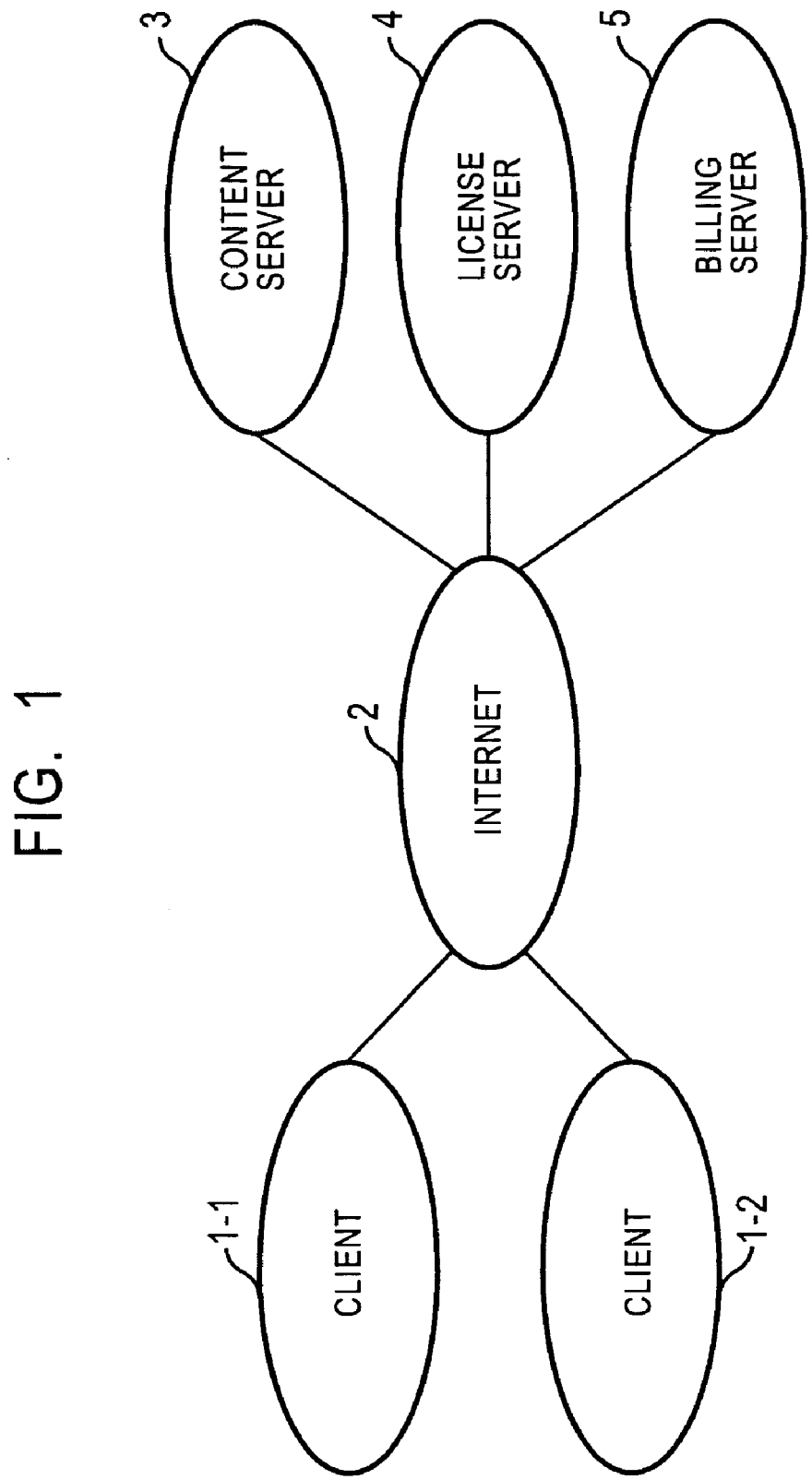
FIG. 1 is a diagram showing the configuration of a content providing system according to the present invention.

FIG. 1 shows the configuration of a content providing system according to the present invention. Clients 1-1 and 1-2 (hereinafter simply referred to as a client 1 whenever it is unnecessary to distinguish individual clients) are connected to the Internet 2. Although only two clients are shown in this example, an arbitrary number of clients may be connected to the Internet 2.

In addition, a content server 3 that provides content to the client 1, a license server 4 that grants the client 1 a necessary usage right for using the content provided by the content server 3, and a billing server 5 that bills the client 1 upon reception of the usage right by the client 1 are connected to the Internet 2.

An arbitrary number of each of the content server 3, the license server 4, and the billing server 5 are connected, where necessary, to the Internet 2.

Figure 2:
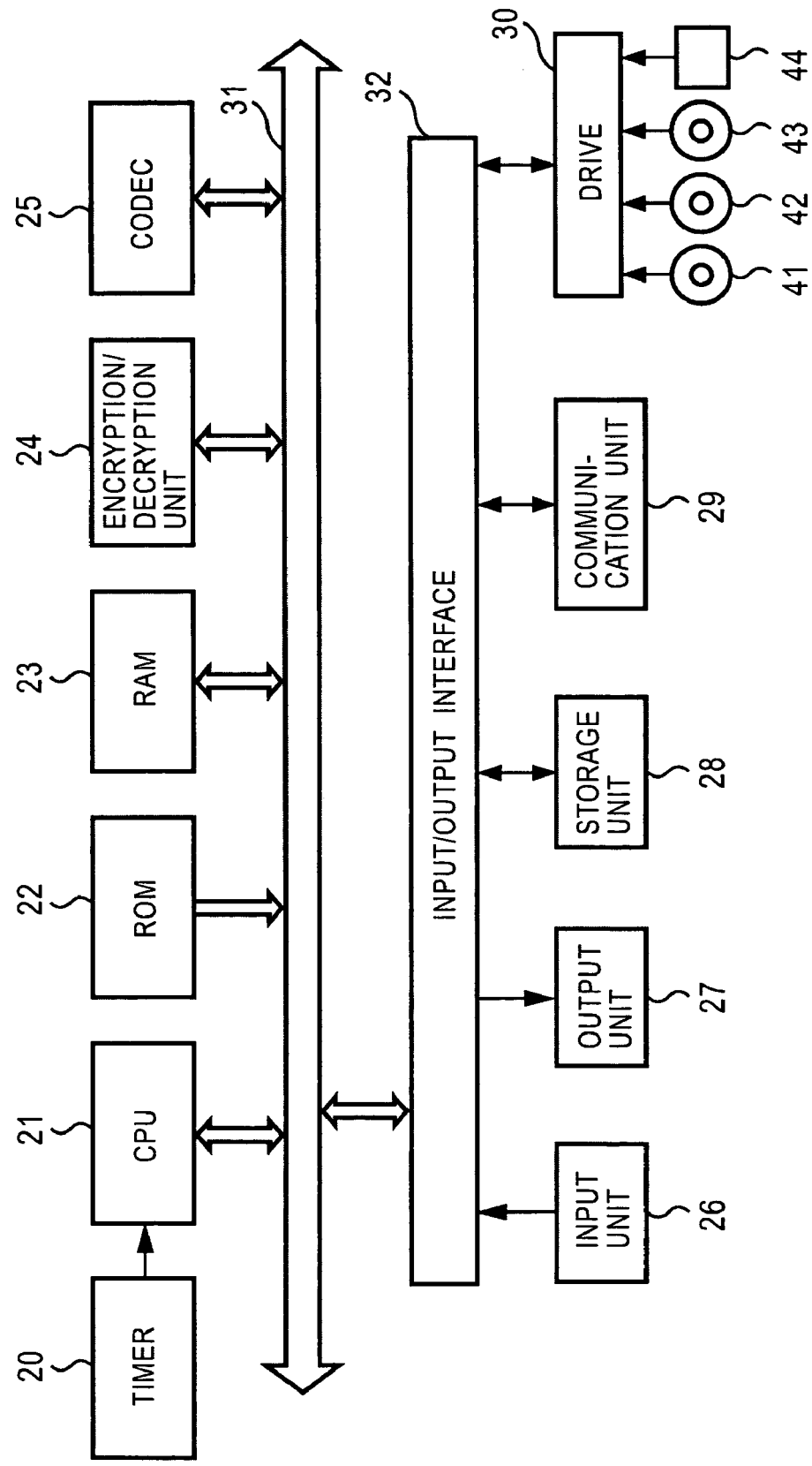
FIG. 2 is a block diagram showing the configuration of each client shown in FIG. 1.

FIG. 2 shows the configuration of each client 1.

Referring to FIG. 2, a CPU (Central Processing Unit) 21 performs various processes in accordance with a program stored in a ROM (Read Only Memory) 22 or a program loaded from a storage unit 28 to a RAM (Random Access Memory) 23. A timer 20 keeps time and supplies time information to the CPU 21. The RAM 23 appropriately stores necessary data for performing various processes by the CPU 21.

An encryption/decryption unit 24 encrypts content data and decrypts encrypted content data. A codec 25 encodes content data in, for example, ATRAC (Adaptive Transform Acoustic Coding) 3 and supplies and records the encoded content data via an input/output interface 32 onto a semiconductor memory 44 connected to a drive 30. Also, the codec 25 decodes encoded data read from the semiconductor memory 44 via the drive 30.

The semiconductor memory 44 includes, for example, a memory stick (trademark).

The CPU 21, the ROM 22, the RAM 23, the encryption/decryption unit 24, and the codec 25 are interconnected via a bus 31. Also, the input/output interface 32 is connected to the bus 31.

An input unit 26 including a keyboard, a mouse, and the like, an output unit 27 including a display, such as a CRT or an LCD, a speaker, and the like, a storage unit 28 including a hard disk and the like, and a communication unit 29 including a modem, a terminal adapter, and the like are connected to the input/output interface 32. The communication unit 29 performs communication via the Internet 2. The communication unit 29 communicates analog signals or digital signals with another client.

Where necessary, the drive 30 is connected to the input/output interface 32. On the drive 30, a magnetic disk 41, an optical disk 42, a magneto-optical disk 43, or the semiconductor memory 44 is appropriately placed. Where necessary, a computer program read from the placed medium is installed on the storage unit 28.

Although not shown in the drawing, basically the content server 3, the license server 4, and the billing server 5 each have a computer having a configuration similar to that of the client 1 shown in FIG. 2. In the following description, the configuration shown in FIG. 2 may also be cited as the configuration of the content server 3, the license server 4, the billing server 5, and the like.

Although not shown in the drawing, a PD (Portable Device) also includes a computer having a configuration that is basically similar to that of the client 1 shown in FIG. 2.

Figure 3:
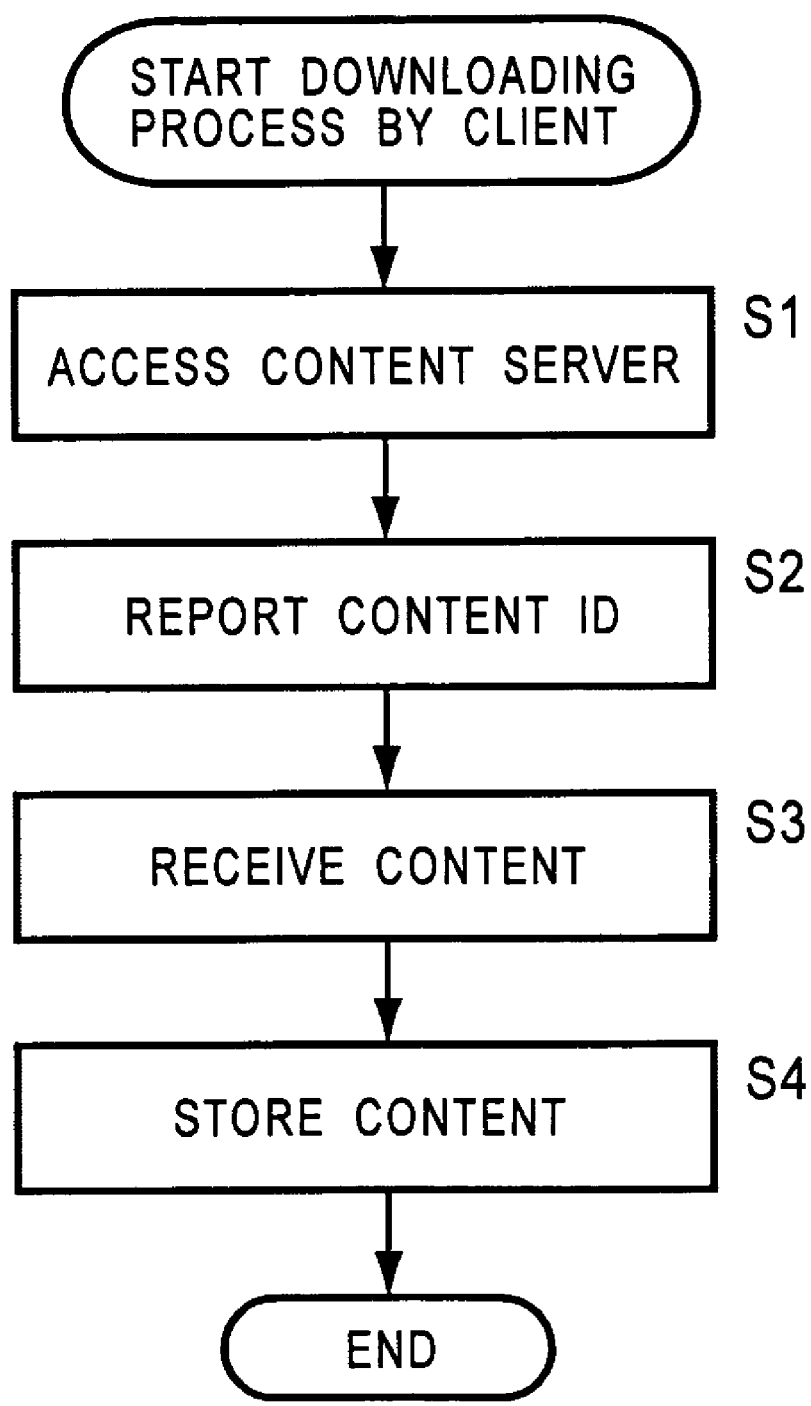
FIG. 3 is a flowchart describing a content downloading process by the client shown in FIG. 1.

With reference to a flowchart of FIG. 3, a process of receiving content, which is provided by the content server 3, by the client 1 will now be described.

When a user instructs the client 1 to access the content server 3 by operating the input unit 26, in step S1, the CPU 21 controls the communication unit 29 to access the content server 3 via the Internet 2. In step S2, when the user operates the input unit 26 to specify content to be provided, the CPU 21 receives this specification information and notifies the content server 3 of the content ID of the specified content using the communication unit 29 via the Internet 2. As will be described below with reference to a flowchart of FIG. 4, the content server 3 having been notified of the content ID transmits the content including encrypted content data. In step S3, the CPU 21 receives the content data via the communication unit 29. In step S4, the CPU 21 supplies and stores the encrypted content data in the hard disk included in the storage unit 28.

Figure 4:
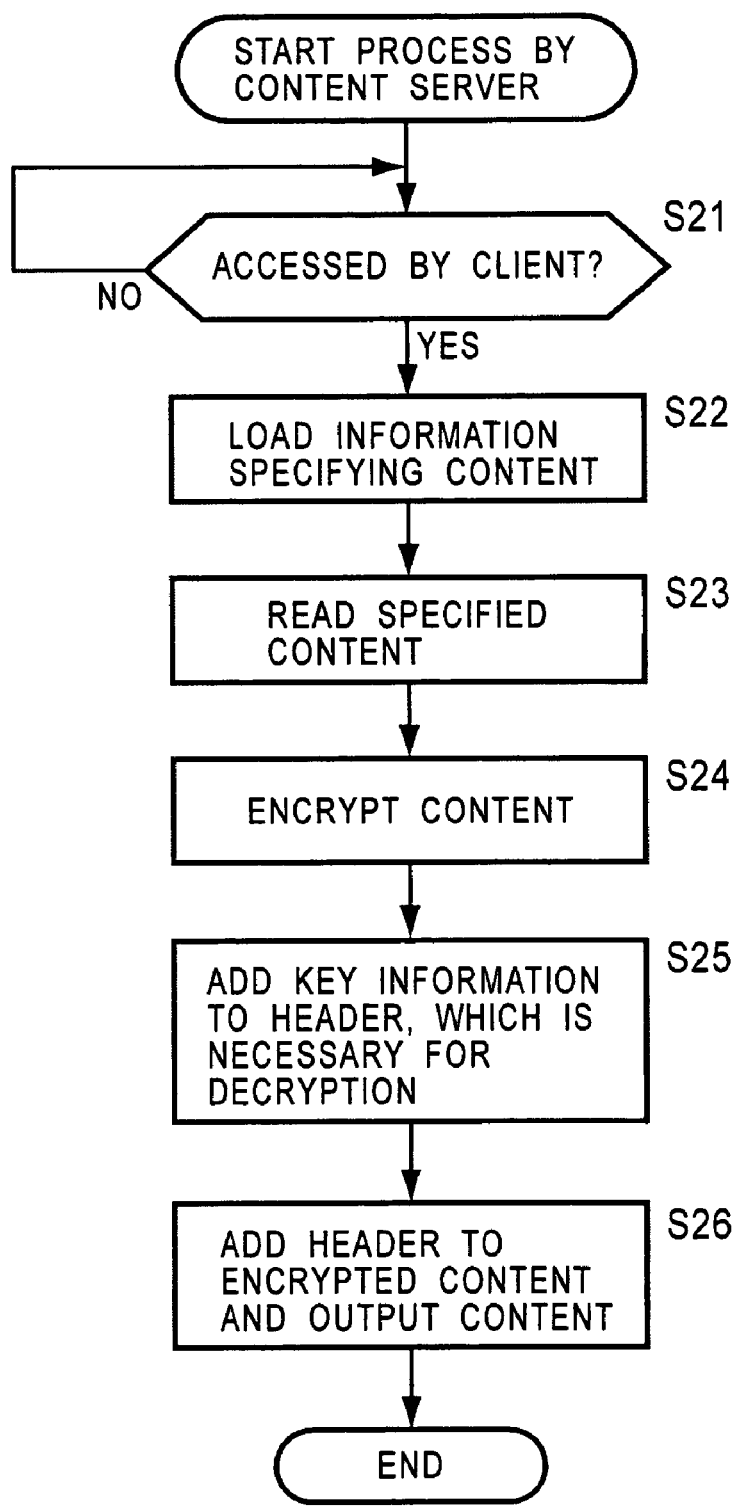
FIG. 4 is a flowchart describing a content providing process by a content server shown in FIG. 1.

With reference to the flowchart of FIG. 4, a content providing process by the content server 3, which is performed in association with the above-described process by the client 1, will now be described. In the following description, the configuration of the client 1 shown in FIG. 2 is also cited as the configuration of the content server 3.

In step S21, the CPU 21 of the content server 3 is queued until the content server 3 is accessed by the client 1 using the communication unit 29 via the Internet 2. When it is determined that the content server 3 has been accessed by the client 1, in step S22, the CPU 21 of the content server 3 loads the content ID transmitted by the client 1. This content ID is the information notified by the client 1 in step S2 of FIG. 3.

In step S23, the CPU 21 of the content server 3 reads, from content stored in the storage unit 28, content data specified by the content ID loaded by the processing in step S22. In step S24, the CPU 21 supplies the content data read from the storage unit 28 to the encryption/decryption unit 24, which in turn encrypts the content data using a content key Kc.

Since the content data stored in the storage unit 28 has already been encoded in ATRAC 3 by the codec 25, the encoded content data is encrypted.

Alternatively, encrypted content data may be stored in the storage unit 28. In this case, the processing in step S24 may be omitted.

In step S25, the CPU 21 of the content server 3 adds key information to the header of the format for transmitting the encrypted content data. This key information is required to decrypt the encrypted content (EKB and $K_{EKBC}(KC)$ described below with reference to FIG. 5). In step S26, the CPU 21 of the content server 3 transmits the content encrypted by the processing in step S24 and the data formatted in which the key information is added to the header by the processing in step S25 using the communication unit 29 via the Internet 2 to the client 1 having accessed the content server 3.

Figure 5:
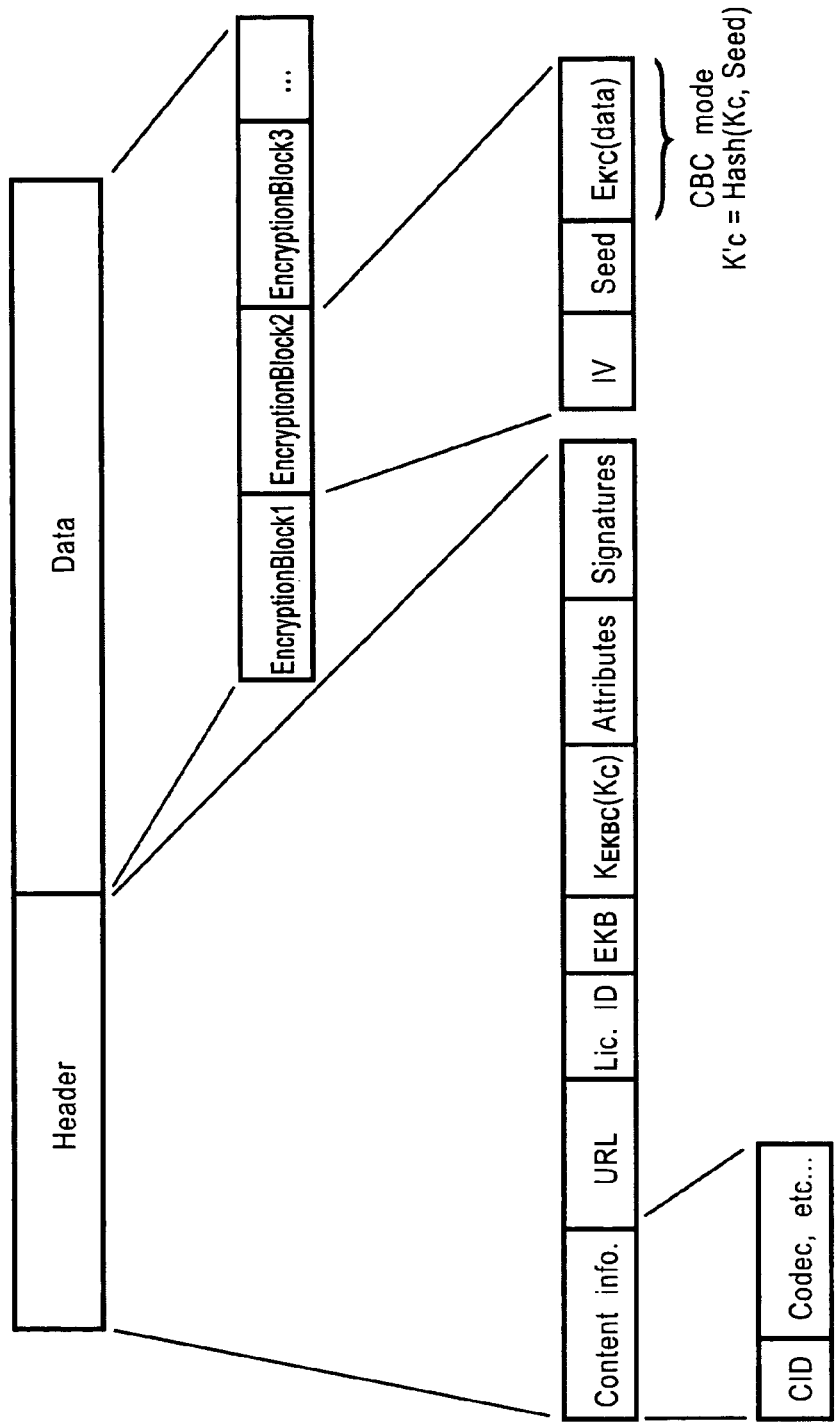
FIG. 5 is an illustration of an example of the format in step S26 of FIG. 4.

FIG. 5 is an illustration of the structure of the format of content provided by the content server 3 to the client 1. As shown in the illustration, basically the format includes the header and data.

The header includes content information, URL (Uniform Resource Locator), an enabling key block (EKB), data $K_{EKBC}(KC)$ serving as a content key Kc encrypted using a key $K_{EKBC}$ generated from the EKB, attributes of content, and signatures. The EKB will be described below with reference to FIGS. 13 and 14.

The content information includes the content ID (CID) serving as identification information for identifying content data formatted as data and information indicating the codec format of the content.

The URL is address information required to gain access to obtain a necessary usage right for using the content. In the case of the system shown in FIG. 1, specifically the URL is the address of the license server 4, which is required to receive a usage right.

The attributes of the content are information concerning the content. The attributes of the content include the content ID, record company ID serving as identification information for identifying the provider of the content, and artist ID serving as identification information for identifying the artist. In this embodiment, the attributes are used to specify the content to be used by the usage right.

The signatures are digital signatures associated with the attributes of the content.

The data includes an arbitrary number of encryption blocks. Each of the encryption blocks includes an initial vector (IV), seed, and data $E_{K'c}(data)$ produced by encrypting the content data using a key K'c.

The Key K'c is, as shown by the following equation, a value computed by applying the content key Kc and the random-number seed to a hash function:

K'c=Hash(Kc, Seed)

The initial vector IV and the seed are set to different values in each encryption block.

The data of the content is encrypted in units of eight bytes. The data of the content is encrypted in a CBC (Cipher Block Chaining) mode in which the subsequent eight bytes are encrypted using the result of encryption of the previous eight bytes.

In the CBC mode, when the first eight bytes of content data are to be encrypted, there is no result of encryption of eight bytes prior to these first eight bytes. The first eight bytes of content data are thus encrypted using the initial vector IV serving as initial values.

With the encryption in the CBC mode, even when one encryption block is decrypted, its influence does not extend to the other encryption blocks.

Alternatively, the content may be encrypted in another encryption mode.

In the above described manner, the client 1 freely obtains content from the content server 3 free of charge. Therefore, many pieces of content can be distributed.

Figure 6:
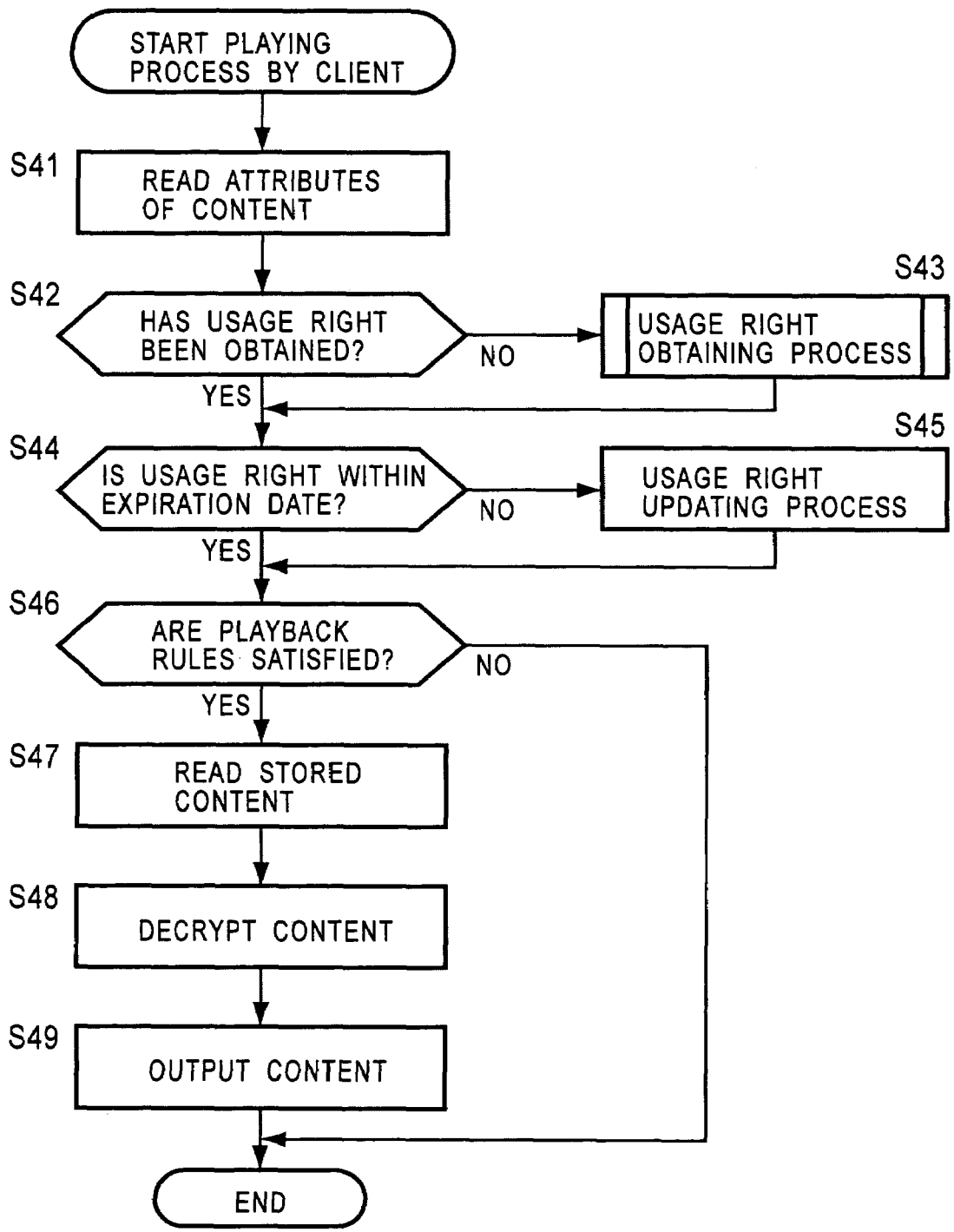
FIG. 6 is a flowchart describing a content playing process by the client shown in FIG. 1.

In order that each client 1 uses obtained content, the client 1 needs to have a usage right proving that the use of the content is permitted. Referring to FIG. 6, a content playing process by the client 1 will now be described.

In step S41, the CPU 21 of the client 1 obtains the content identifying information (CID) specified by the user by operating the input unit 26. This identifying information includes, for example, the title of the content, the number attached to each piece of the stored content, and the like.

When the content is specified, the CPU 21 reads attributes of the content. The attributes are, as shown in FIG. 5, described in the header of the content.

In step S42, the CPU 21 determines whether the client 1 has already obtained a usage right whose content rules included therein are satisfied by the attributes read in step S41 and has already stored this usage right in the storage unit 28. When such a usage right has not been obtained yet, in step S43, the CPU 21 performs a usage right obtaining process. The details of the usage right obtaining process will be described below with reference to a flowchart of FIG. 7.

When it is determined in step S42 that the usage right has already been obtained, or when the usage right obtaining process is performed in step S43 and the usage right is obtained, in step S44, the CPU 21 determines whether the obtained usage right is within its expiration date. Whether the usage right is within the expiration date is determined by comparing the date defined in the usage right (see FIG. 8 described below) with the current date and time kept by the timer 20. When it is determined that the expiration date of the usage right has already passed, in step S45, the CPU 21 performs a usage right updating process.

When it is determined in step S44 that the usage right is within the expiration date, or when the usage right is updated in step S45, in step S46, the CPU 21 reads usage rules included in the usage right and the usage status (described below), which are stored in the storage unit 28, and determines whether playback rules are satisfied by the usage rules and the usage status.

When it is determined in step S46, on the basis of the usage rules included in the usage right and the usage status, that the content is permitted to be played, in step S47, the CPU 21 reads the encrypted content data from the storage unit 28 and stores the encrypted content data in the RAM 23. In step S48, the CPU 21 supplies the encrypted content data stored in the RAM 23 in units of encryption blocks arranged in the data shown in FIG. 5 to the encryption/decryption unit 24, which in turn decrypts the encrypted content data using the content key Kc.

A specific example of a method of obtaining the content key Kc will be described below with reference to FIGS. 13 and 14. Using a device node key (DNK), the key $K_{EKBC}$ included in the EKB (FIG. 5) is obtained. Using the key $K_{EKBC}$, the content key Kc is obtained from the data $K_{EKBC}(KC)$ (FIG. 5).

In step S49, the CPU 21 supplies the content data decrypted by the encryption/decryption unit 24 to the codec 25 to be decoded. The CPU 21 supplies the data decoded by the codec 25 from the input/output interface 32 to the output unit 27, D/A-converts the data, and outputs the converted data via the speaker.

When it is determined in step S46, on the basis of the usage rules included in the usage right and the usage status, that the content is prohibited from being played, the content is not output. The process is terminated.

With reference to the flowchart of FIG. 7, the usage right obtaining process performed in step S43 of FIG. 6 will be described in detail.

By registering itself in the license server, the client 1 obtains service data including a leaf ID, a DNK (Device Node Key), a pair of a private key and a public key of the client 1, a public key of the license server, and a certificate of each public key.

The leaf ID indicates identification information allocated to each client. The DNK is a necessary device node key for decrypting the content key Kc encrypted by the EKB (enabling key block) included in the content (described below with reference to FIG. 10).

In step S61, the CPU 21 obtains the URL described in the header of the content. As described above, the URL is the address to gain access to obtain a necessary usage right for using the content. In step S62, the CPU 21 accesses the URL obtained in step S61. Specifically, the communication unit 29 accesses the license server 4 via the Internet 2. In response to the access, the license server 4 transmits a list of usage rights to the client 1. Also, the license server 4 requests the client 1 to input usage right specifying information for specifying the usage right to be purchased (necessary usage right for using the content), user ID, and password (step S102 of FIG. 9 described below). The CPU 21 displays the request on the display unit of the output unit 27. On the basis of the displayed request, the user operates the input unit 26 to input the usage right specifying information, user ID, and password. The user ID and password are obtained in advance by the user of the client 1 by accessing the license server 4 via the Internet 2.

In steps S63 and 64, the CPU 21 loads the usage right specifying information, user ID, and password input by the input unit 26. In step S65, the CPU 21 controls the communication unit 29 to transmit the input user ID, password, usage right specifying information, and a usage right request including the leaf ID included in the service data (described below) to the license server 4 via the Internet 2.

Figure 9:
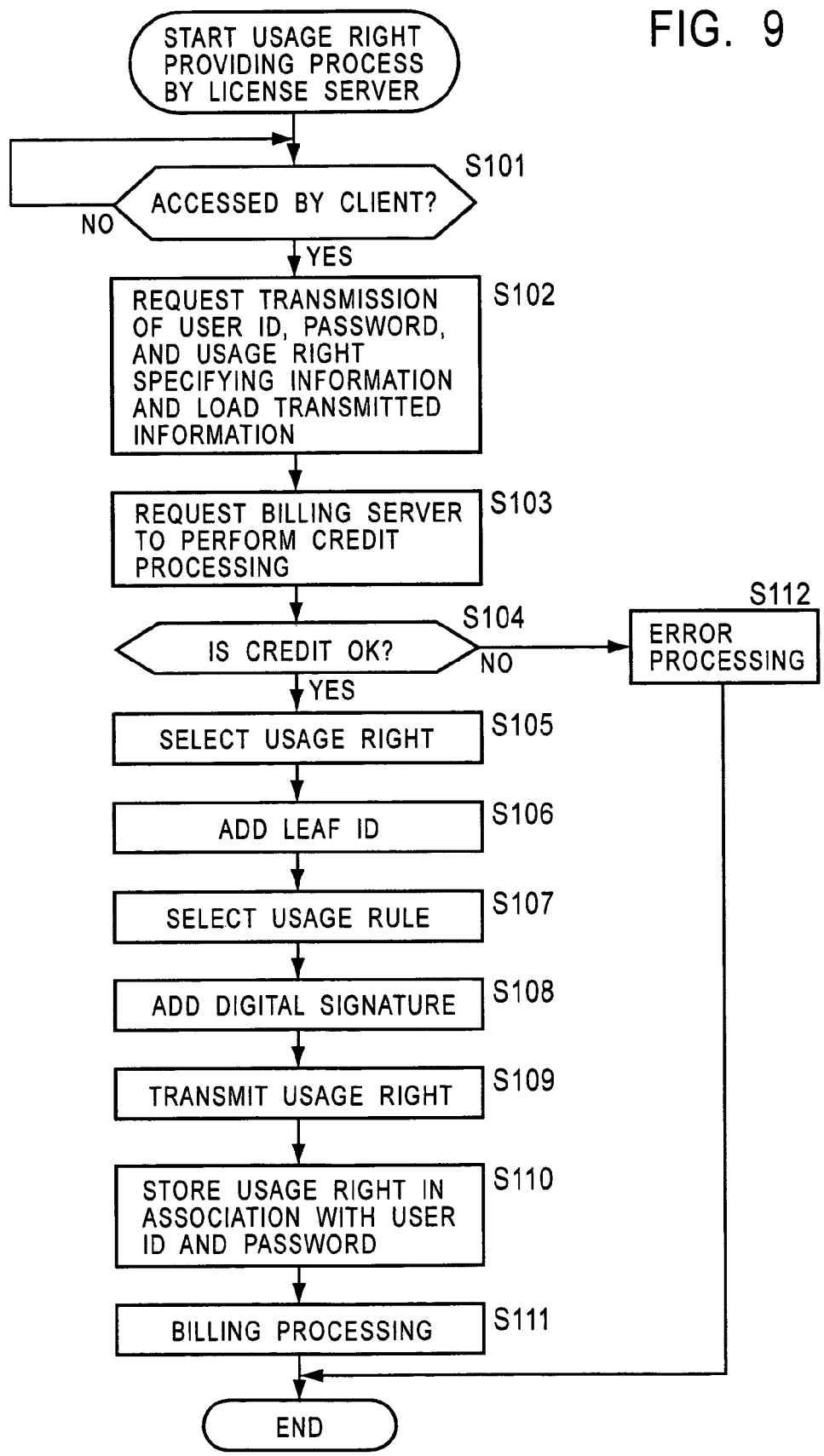
FIG. 9 is a flowchart describing a usage right providing process by a license server shown in FIG. 1.

As will be described below with reference to FIG. 9, the license server 4 transmits the usage right on the basis of the user ID, password, and usage right specifying information (step S109). Alternatively, if the rules are not satisfied, the license server 4 transmits no usage right (step S112).

In step S66, the CPU 21 determines whether the usage right has been transmitted from the license server 4. When the usage right has been transmitted, in step S67, the CPU 21 supplies and stores the usage right in the storage unit 28.

When it is determined in step S66 that no usage right is transmitted, in step S68, the CPU 21 performs the error processing. Specifically, since the usage right for using the content is not obtained, the CPU 21 prohibits the content playing process.

As described above, each client 1 can use content only after having obtained a necessary usage right for using the content.

Figure 7:
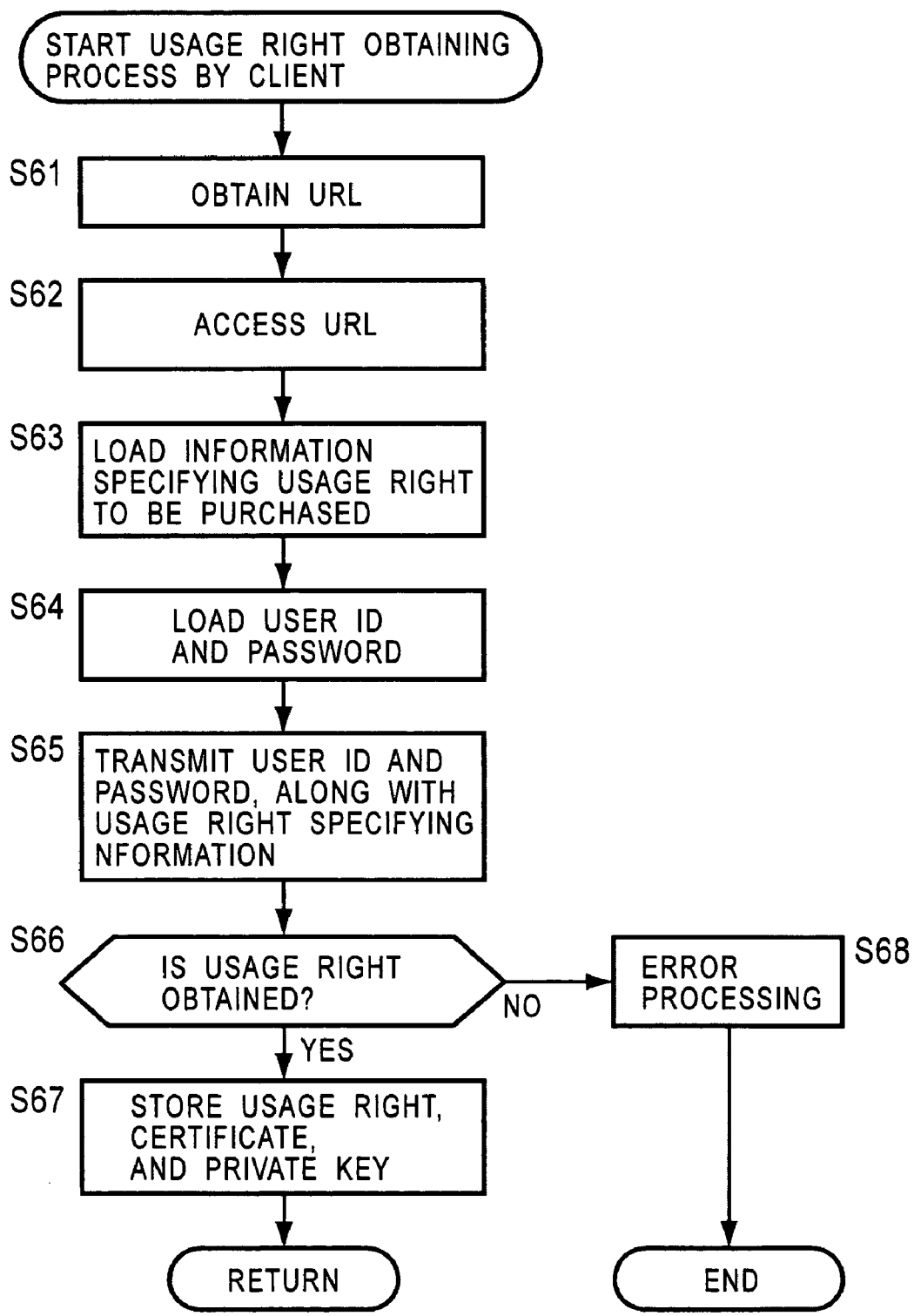
FIG. 7 is a flowchart describing the details of a usage right obtaining process in step S43 of FIG. 6.

Alternatively, each user may perform the usage right obtaining process shown in FIG. 7 prior to obtaining the content.

The usage right provided to the client 1 includes, as shown in FIG. 8, usage rules, a leaf ID, a digital signature, and the like.

A version is information describing the version of the usage right by separating a major version and a minor version by a dot.

A profile, which is described using a decimal integer, is information for defining the limitation of a method of describing the usage right.

A usage right ID, which is described using a hexadecimal constant, is identification information for identifying the usage right.

A creation date indicates the date on which the usage right is created.

An expiration date indicates the expiration date of the usage right. The expiration date 23:59:59 of the year 9999 indicates that there is no limit on the expiration date.

The usage rules include information indicating the expiration date for using the content on the basis of the usage right; the expiration date for playing the content on the basis of the usage right; the maximum number of times the content can be played; the number of times the content can be copied on the basis of the usage right (the number of permitted copies); the maximum number of times the content can be checked out; whether the content can be recorded on a CD-R on the basis of the usage right; the number of times the content can be copied to a PD (Portable Device); whether the usage right can be transferred; and whether it is obliged to keep the usage log.

Digital signatures of the usage rules are associated with the usage rules.

Constants are referred to by the usage rules or the usage status.

The leaf ID is identification information for identifying the client.

The digital signature is associated with the overall usage right.

A certificate includes the public key of the license server.

The storage unit 28 of the client 1 stores, in addition to the usage rules of the usage right, the usage status serving as information indicating the status of the content and the usage right. The usage status includes information indicating the number of times the content is played on the basis of the associated usage right; the number of times the content is copied; the number of times the content is checked out; the date on which the content is played for the first time; the number of times the content is recorded on a CD-R; and record information concerning the content or the usage right.

Whether the rules of playing the content are satisfied is determined in step S46 of FIG. 6 on the basis of the usage rules included in the usage right and the usage status stored, along with the usage right, in the storage unit 28. For example, when the number of times the content is played, which is stored in the usage status, is less than the maximum number of times the content can be played, which is included in the usage rule, it is determined that the playback rule is satisfied.

With reference to a flowchart of FIG. 9, the usage right providing process by the license server 4, which is performed in association with the usage right obtaining process by the client 1, which is shown in FIG. 7, will now be described. The configuration of the client 1 shown in FIG. 2 is cited as the configuration of the license server 4.

In step S101, the CPU 21 of the license server 4 is queued until the license server 4 is accessed by the client 1. When the license server 4 is accessed by the client 1, in step S102, the CPU 21 transmits a list of usage rights, including information concerning each usage right, to the client 1 having accessed the license server 4. Also, the CPU 21 of the license server 4 requests the client 1 to transmit the user ID, password, and usage right specifying information. As described above, when the client 1 transmits the user ID, password, leaf ID, and usage right specifying information (may be the usage right ID) by the processing in step S65 of FIG. 7, the CPU 21 of the license server 4 receives these pieces of information via the communication unit 29 and loads the received information.

In step S103, the CPU 21 of the license server 4 accesses the billing server 5 via the communication unit 29 and requests the billing server 5 to perform the credit processing of the user associated with the user ID and password. In response to the credit processing request from the license server 4 via the Internet 2, the billing server 5 investigates the past payment record of the user associated with the user ID and password and determines whether the user has failed to pay the fee for a usage right in the past. If no such record exists, the CPU 21 transmits the credit result allowing the grant of the usage right. If a payment failure record exists, the CPU 21 transmits the credit result prohibiting the grant of the usage right.

In step S104, the CPU 21 of the license server 4 determines whether the credit result from the billing server 5 allows the grant of the usage right. When the grant of the usage right is allowed, in step S105, the CPU 21 obtains, from usage rights stored in the storage unit 28, the usage right associated with the usage right specifying information loaded by the processing in step S102. Each of the usage rights stored in the storage unit 28 includes beforehand information, such as the usage right ID, version, creation date, and expiration date. In step S106, the CPU 21 adds the received leaf ID to the usage right. In step S107, the CPU 21 selects the usage rule associated with the usage right selected in step S105. Alternatively, when the user has specified the usage rule by the processing in step S102, the specified usage rule is added, where necessary, to the prepared usage rules. The CPU 21 adds the selected usage rule to the usage right. Alternatively, the usage rule may be added in advance to the usage right.

In step S108, the CPU 21 signs the usage right using a private key of the license server and adds a certificate including the public key of the license server to the usage right, thus generating the usage right arranged as shown in FIG. 8.

In step S109, the CPU 21 of the license server 4 causes the communication unit 29 to transmit the usage right (arranged as shown in FIG. 8) via the Internet 2 to the client 1.

In step S110, the CPU 21 of the license server 4 stores the usage right (including the usage rule and the leaf ID), which has been transmitted by the processing in step S109, in the storage unit 28 in association with the user ID and password loaded by the processing in step S102. In step S111, the CPU 21 performs the billing processing. Specifically, the CPU 21 requests, using the communication unit 29, the billing server 5 to bill the user associated with the user ID and password. In response to the billing request, the billing server 5 bills the user. As described above, when the user who has been billed for the fee does not pay the fee, from this point onward, the user is not allowed to receive a usage right even when the user requests the grant of the usage right.

Specifically, in this case, the billing server 5 transmits the credit result prohibiting the grant of the usage right. The process proceeds from step S104 to step S112. The CPU 21 performs the error processing. Specifically, the CPU 21 of the license server 4 controls the communication unit 29 to transmit a message indicating that the grant of the usage right is prohibited to the client 1 having accessed the license server 4. The process is terminated.

In this case, as described above, since the client 1 cannot receive the usage right, the client 1 is prohibited from using the content (decrypting the encrypted content and playing the content).

Figure 10:
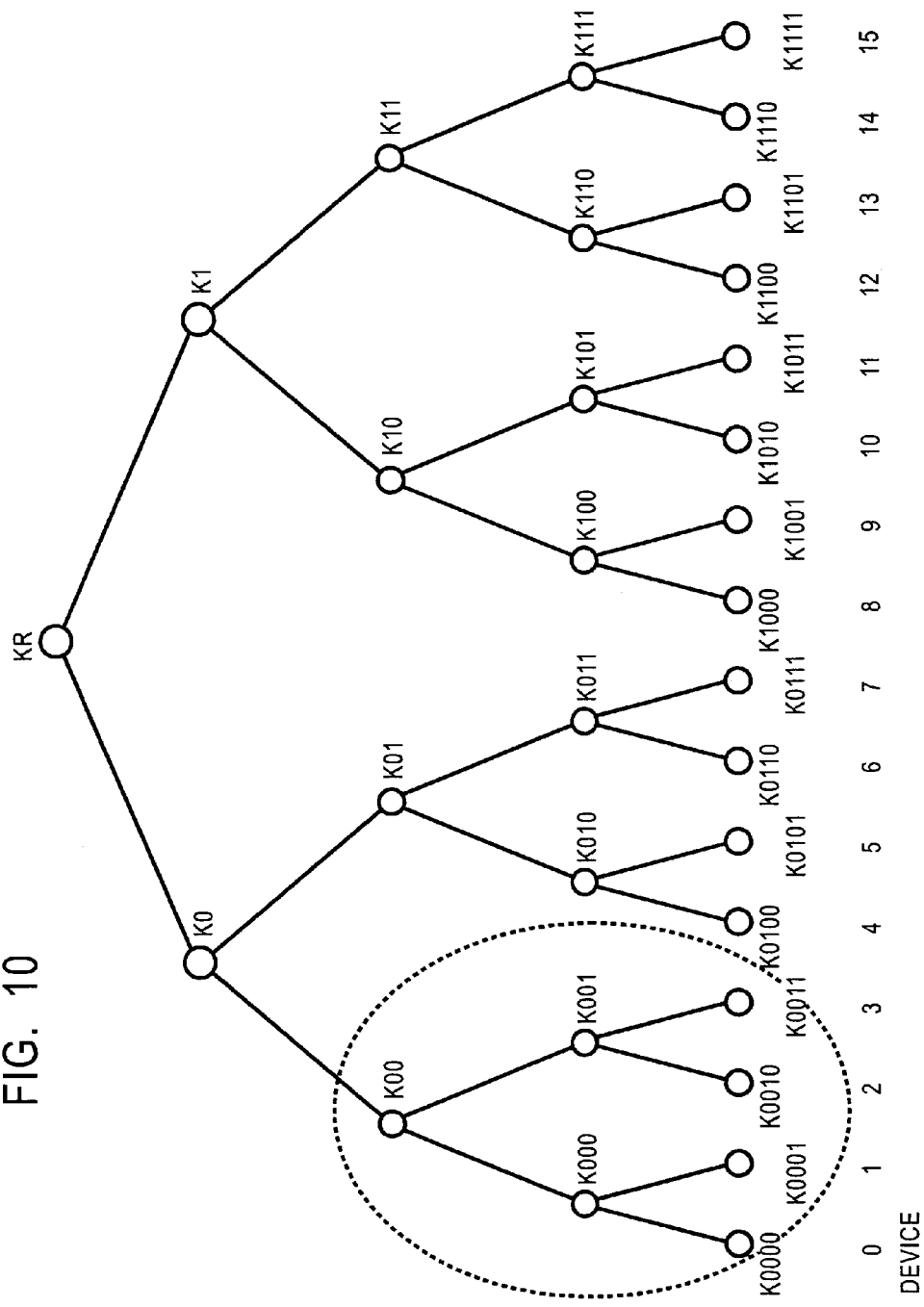
FIG. 10 is a diagram describing the arrangement of keys.

In the present invention, as shown in FIG. 10, devices and keys are managed on the basis of the principle of broadcast encryption. Keys are arranged in a hierarchical tree structure having leafs at the bottom level being associated with keys unique to individual devices. For hierarchical-tree-structure key management used in the system of the present invention, see Japanese Unexamined Patent Application Publication No. 2001-352321. In the example shown in FIG. 10, keys associated with 16 devices 0 to 15 are generated.

Each key is defined associated with a node of the tree structure, which is denoted by a circle in the illustration. In the example, a root key KR is defined associated with a root node at the top level. Keys K0 and K1 are defined associated with nodes at the second level. Keys K00 to K11 are defined associated with nodes at the third level. Keys K000 to K111 are defined associated with nodes at the fourth level. Keys K0000 to K1111 are defined associated with leafs (device nodes) serving as nodes at the bottom level.

Since the keys are arranged in the hierarchical structure, for example, the key on top of key K0010 and key 0011 is K001, and the key on top of key K000 and K001 is K00. Similarly, the key on top of key K00 and key K01 is K0, and the key on top of K0 and K1 is KR.

A key for using content is managed by keys associated with nodes on a path from each device node (leaf) at the bottom level to the root node at the top level. For example, a device associated with leaf 3 manages a key for using content by keys K0011, K001, K00, K0, and KR on the corresponding path.

Figure 11:
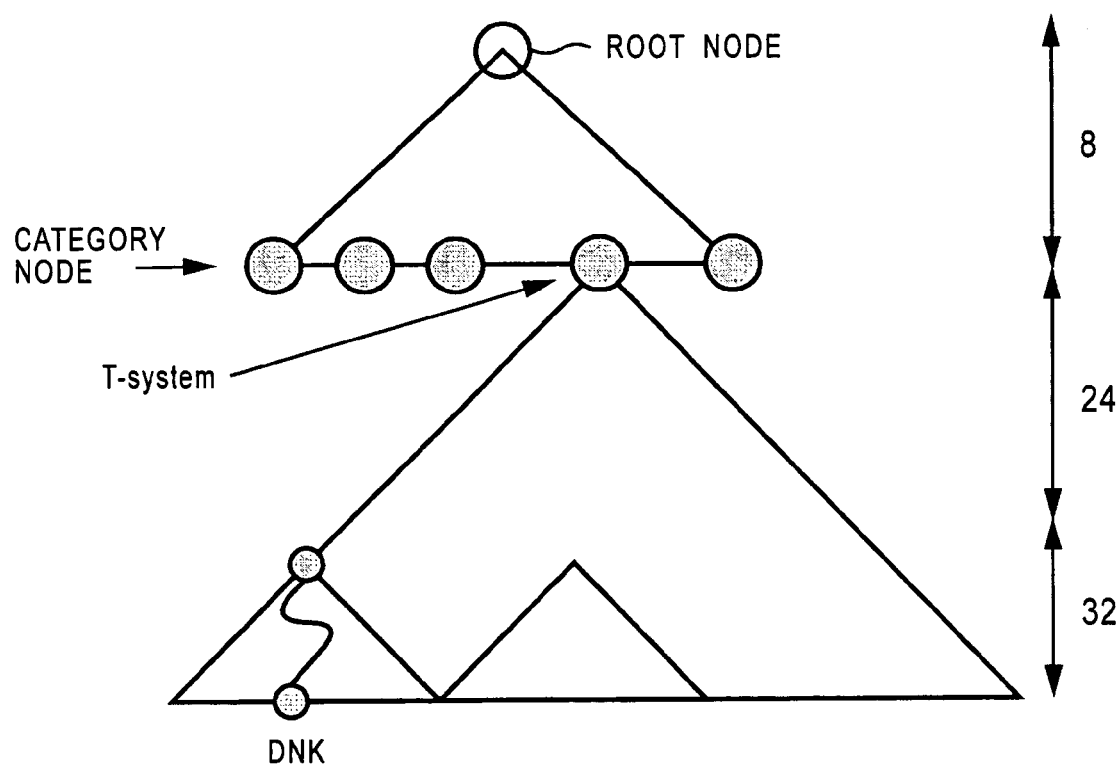
FIG. 11 is a diagram describing category nodes.

In the system of the present invention, as shown in FIG. 11, device keys and content keys are managed by a key system based on the principle shown in FIG. 10. In the example shown in FIG. 11, nodes at 8+24+32 levels are arranged in a tree structure, and nodes from the root node to nodes at the eighth level below the root node are associated with categories. The term category refers to, for example, the category of devices using semiconductor memories, such as memory sticks, or the category of devices receiving digital broadcast programs. One of these category nodes is associated with the present system serving as a system for managing licenses (referred to as a T system).

Specifically, keys associated with nodes at 24 levels below the node associated with the T system are associated with service providers or services offered by the service providers. In this example, $2^{24}$ (approximately 16 M) service providers or services can be defined. Using the bottom 32 levels, $2^{32}$ (approximately 4 G) users (or clients 1) can be defined. Keys associated with nodes on a path from each node at the bottom level or the 32nd level to the node associated with the T system constitute a DNK (Device Node Key). The ID associated with each leaf at the bottom level is the leaf ID.

A content key that has encrypted content is encrypted by an updated root key KR'. An updated node key at a higher level is encrypted using an updated node key at a lower level, which is most adjacent to the updated node key at the higher level. This encrypted node key is arranged in an EKB (described hereinafter with reference to FIGS. 13 and 14). In the EKB, an updated node key at a level above the end of the EKB is encrypted by a node key or leaf key at the end of the EKB, and the encrypted node key is arranged in the EKB. Using any key included in the DNK described in service data, the client 1 decrypts an updated node key at a level higher than the used key, which is most adjacent to the used key and which is described in the EKB (FIGS. 13 and 14) distributed along with content data. Using the decrypted key, the client 1 decrypts an updated node key at a level higher than this key described in the EKB. The client 1 performs the similar processing one after another to obtain the updated root key KR'.

Figure 12:
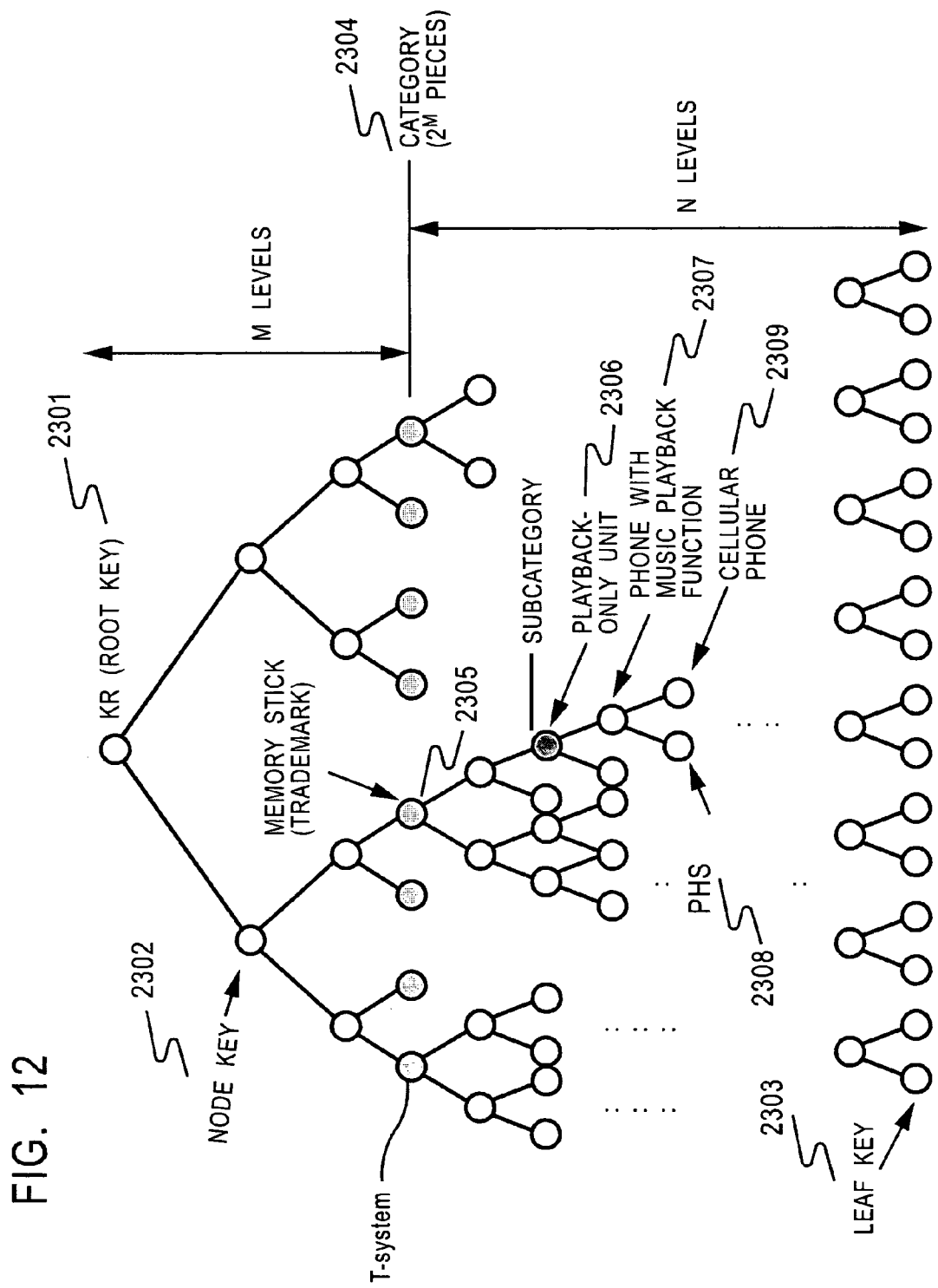
FIG. 12 is a diagram showing a specific example of the association between a node and a device.

FIG. 12 shows a specific example of classification of categories in the hierarchical tree structure. Referring to FIG. 12, root key KR2301 is set at the top level of the hierarchical tree structure; node keys 2302 are set at the intermediate levels below the top level; and leaf keys 2303 are set at the bottom level. Devices each hold a device node key (DNK) consisting of the corresponding leaf key, a series of node keys from the leaf key to the root key, and the root key.

Predetermined nodes at the M-th level from the top (M 8 in the example shown in FIG. 11) are set as category nodes 2304. Specifically, nodes at the M-th level are set as device setup nodes belonging to specific categories. Let one node at the M-th level be the apex. Nodes and leafs at the (M+1)-th level and below are regarded as nodes and leafs concerning devices included in that category.

For example, a node 2305 at the M-th level in FIG. 12 is set to the category [memory stick (trademark)]. A series of nodes and leafs below the node 2305 is set as nodes and leafs dedicated to this category including various devices using memory sticks. Specifically, nodes and leafs below the node 2305 are defined as a set of nodes and leafs associated with devices defined belonging to the category "memory stick".

A node at a level a few levels below the M-th level is set as a subcategory node 2306. In the example of FIG. 12, the [playback-only unit] node 2306 is set at a level two levels below the category [memory stick] node 2305. The [playback-only unit] node 2306 is a subcategory node included in the category of devices using memory sticks. Below the playback-only unit node 2306 serving as the subcategory node, a node 2307 is set associated with a phone with a music playback function, which is included in the category of playback-only units. Below the node 2307, a [PHS] node 2308 and a [cellular phone] node 2309 are set, which are included in the category of phones with a music playback function.

Categories and subcategories may be set associated not only with the types of devices, but also with, for example, nodes managed independently by a particular manufacturer, content provider, payment institute, etc., that is, in arbitrary units of, for example, processes, jurisdiction sections, or services provided (hereinafter these are collectively referred to as entities). For example, let one category node be the apex node dedicated to game machines XYZ sold by a game machine manufacturer. Each of the game machines XYZ sold by the manufacturer may store node keys and leaf keys at levels below the apex node. Subsequently, generation and distribution of an enabling key block (EKB) including these node keys and leaf keys below the apex node key enable distribution of encrypted content and distribution and updating of various keys to only those devices that are below the apex node.

When nodes below an apex node are set as nodes associated with categories or subcategories defined associated with this apex node, a manufacturer or content provider that manages the apex node of category levels or subcategory levels independently generates an enabling key block (EKB) having the apex node as the apex of the EKB and distributes this EKB to devices below the apex node. Accordingly, a key may be updated without influencing devices that do not belong to the apex node and that belong to a node of another category.

When it becomes apparent at a particular time t that keys K0011, K001, K00, K0, and KR held by a device 3 are analyzed by a hacker and exposed to the outside, the device 3 needs to be separated from the system (group of devices 0, 1, 2, and 3) to subsequently protect data transferred within the system. To this end, the node keys K001, K00, K0, and KR need to be updated to new keys K(t)001, K(t)00, K(t)0, and K(t)R, respectively, and these updated keys need to be sent to the devices 0, 1, and 2. In this example, K(t)aaa indicates an updated key Kaaa in the generation t.

A method of distributing updated keys will now be described. Keys are updated by supplying, for example, a table including block data referred to as an enabling key block (EKB) shown in FIG. 13 to the devices 0, 1, and 2 via a network or a recording medium having the table stored therein. The enabling key block (EKB) includes encryption keys for distributing new updated keys to devices associated with leafs (nodes at the bottom level) included in the tree structure shown in FIG. 10. The enabling key block (EKB) may also be referred to as a key renewal block (KRB).

The enabling key block (EKB) shown in FIG. 13 includes block data having a data structure that can be updated only by devices for which node keys need to be updated. In the example of FIG. 13, the block data is created to distribute the updated node keys in the generation t to the devices 0, 1, and 2 in the tree structure shown in FIG. 10. As is clear from FIG. 10, the devices 0 and 1 need the updated node keys K(t)00, K(t)0, and K(t)R, whereas the device 2 needs the updated node keys K(t)001, K(t)00, K(t)0, and K(t)R.

As shown by the EKB in FIG. 13, the EKB includes a plurality of encryption keys. For example, the encryption key at the bottom level of FIG. 13 is Enc(K0010, K(t)001), which is the updated node key K(t)001 encrypted by the leaf key K0010 held by the device 2. The device 2 decrypts this encryption key using the leaf key K0010 held by itself to obtain the updated node key K(t)001. Using the updated node key K(t)001 obtained by decryption, the device 2 decrypts the encryption key Enc(K(t)001, K(t)00) at the second level from the bottom of FIG. 13 to obtain the updated node key K(t)00.

Similarly in this sequence, the device 2 decrypts the encryption key Enc(K(t)00, K(t)0) at the second level from the top of FIG. 13 to obtain the updated node key K(t)0. Using the updated node key K(t)0, the device 2 decrypts the encryption key Enc(K(t)0, K(t)R) at the first level from the top of FIG. 13 to obtain the updated root key K(t)R.

In contrast, the node key K000 is not included in the keys to be updated. The nodes 0 and 1 have the following node keys to be updated: K(t)00, K(t)0, and K(t)R. The nodes 0 and 1 each use the device keys K0000 and K0001 to decrypt the encryption key Enc(K000, K(t)00) at the third level from the top of FIG. 13 to obtain the updated node key K(t)00. Similarly in this sequence, the nodes 0 and 1 each decrypt the encryption key Enc(K(t)00, K(t)0) at the second level from the top of FIG. 13 to obtain the updated node key K(t)0. The nodes 0 and 1 each decrypt the encryption key Enc(K(t)0, K(t)R) at the first level from the top of FIG. 13 to obtain the updated root key K(t)R. In this manner, the devices 0, 1, and 2 each obtain the updated key K(t)R.

Indices in FIG. 13 denote the absolute addresses of node keys and a leaf key used as decryption keys for decrypting the encryption keys shown on the right of FIG. 13.

When the node keys K(t)0 and K(t)R at the upper levels of the tree structure shown in FIG. 10 need not be updated and when only the node key K00 needs to be updated, an enabling key block (EKB) in FIG. 14 is used to distribute the updated node key K(t)00 to the devices 0, 1, and 2.

The EKB shown in FIG. 14 can be used to distribute, for example, a new content key to be shared by a specific group. In this specific example, assume that the devices 0, 1, 2, and 3 included in a group denoted by the dotted-chain line of FIG. 10 each use a particular recording medium and need a new common content key K(t)con. In this case, encrypted data Enc(K(t)00, K(t)con) is distributed along with the EKB shown in FIG. 14. The encrypted data Enc(K(t)00, K(t)con) is produced by encrypting the new common updated content key K(t)con using K(t)00, which has updated the node key K00 shared by the devices 0, 1, 2, and 3. By this distribution, data that cannot be decrypted by a device, such as a device 4, belonging to another group is distributed.

Specifically, the devices 0, 1, and 2 each decrypt ciphertext using the key K(t)00 obtained by processing the EKB, thereby obtaining the content key K(t)con at the time t.

Figure 15:
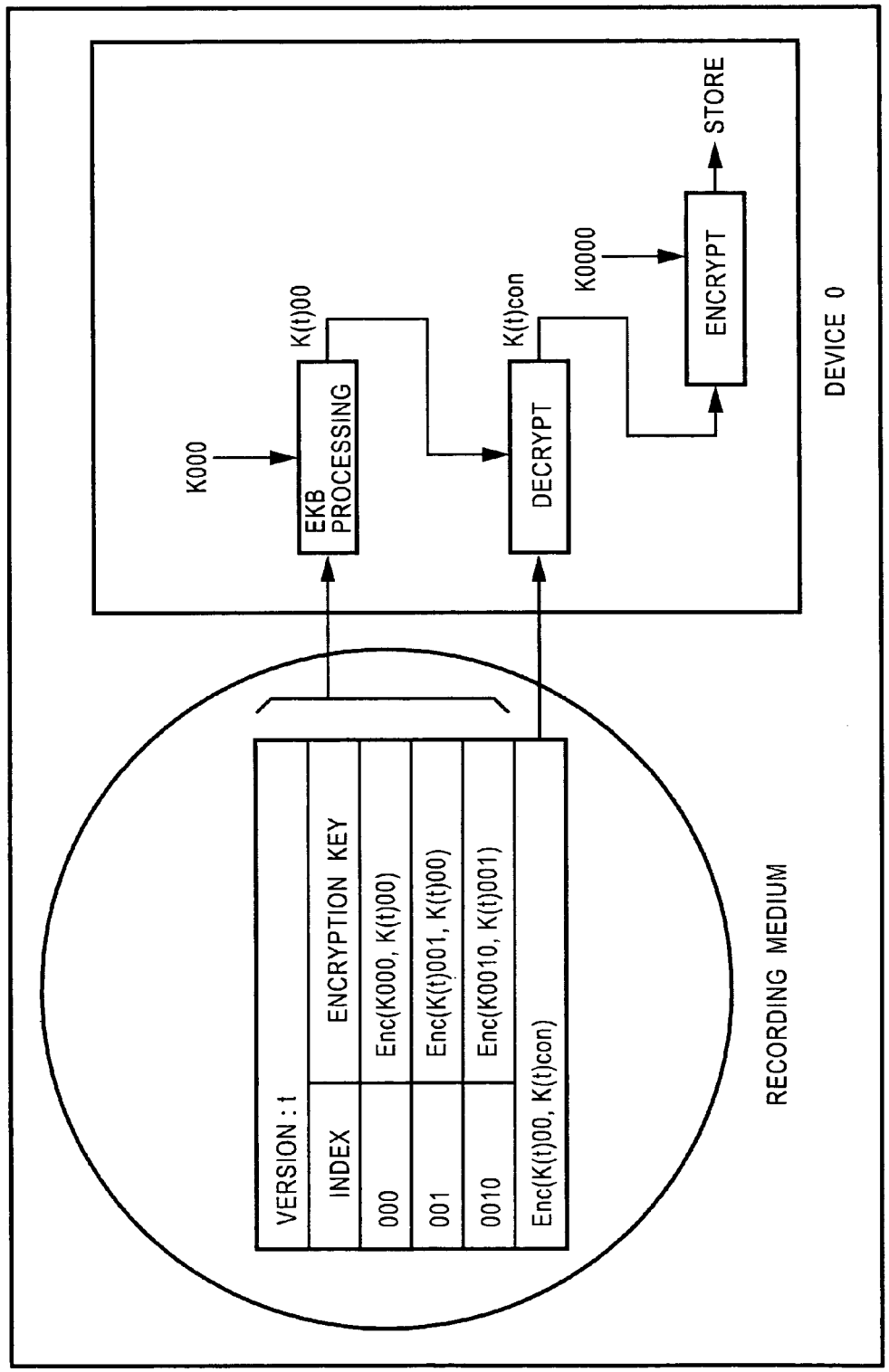
FIG. 15 is a diagram describing use of the enabling key block.

FIG. 15 shows an example of a process of obtaining the content key K(t)con at the time t, which is performed by the device 0 that has received, via a recording medium, the encrypted data Enc(K(t)00, K(t)con), which is produced by encrypting the new common content key K(t)con using K(t)00, and the EKB shown in FIG. 14. Specifically, in this example, message data encrypted by the EKB is the content key K(t)con.

As shown in FIG. 15, the device 0 uses the EKB in the generation t, which is stored in the recording medium, and the node key K000, which is stored in advance in the device 0, to generate the node key K(t)00 by the EKB processing similar to that described above. Using the decrypted updated node key K(t)00, the device 0 decrypts the updated content key K(t)con. To use the decrypted updated content key K(t)con afterwards, the device 0 encrypts the updated content key K(t)con using the leaf key K0000, which is held only by the device 0, and stores the encrypted content key K(t)con.

Figure 16:
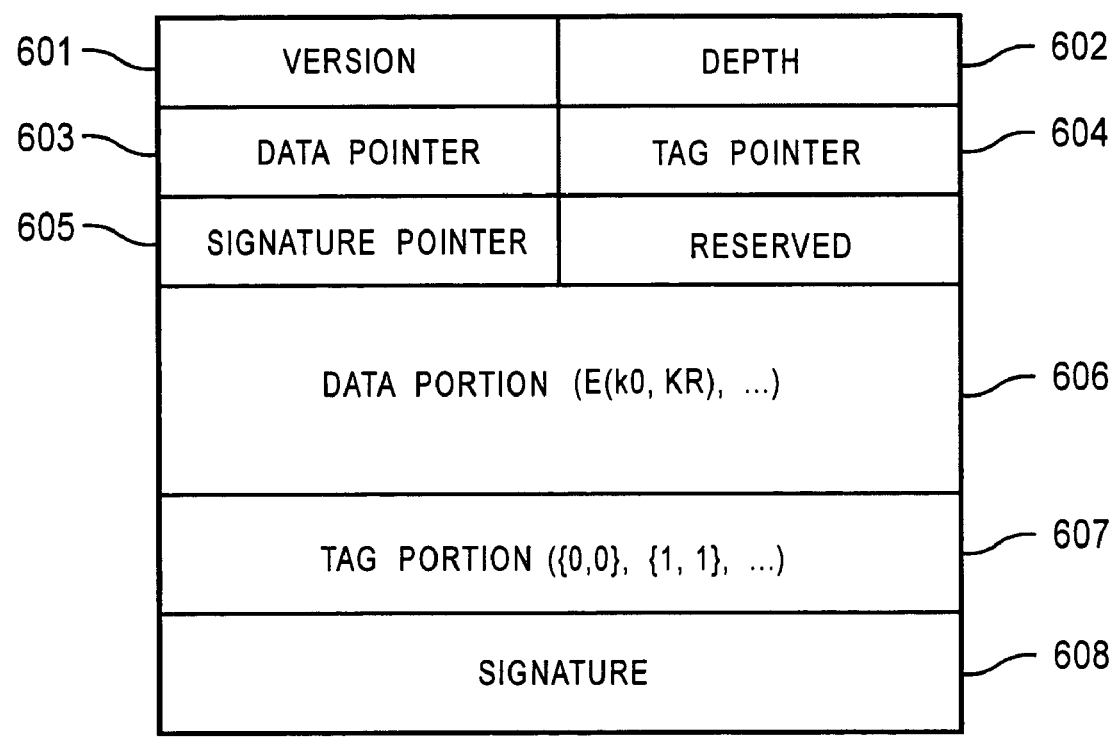
FIG. 16 is an illustration showing an example of the format of an enabling key block.

FIG. 16 shows an example of the format of the enabling key block (EKB). A version 601 is an identifier indicating the version of the enabling key block (EKB). The version has a function of identifying the most recent EKB and a function of indicating the association relationship between the EKB and the content. A depth indicates the number of levels of the hierarchical tree associated with a device to which the enabling key block (EKB) is distributed. A data pointer 603 is a pointer indicating the position of a data portion 606 of the enabling key block (EKB). A tag pointer 604 is a pointer indicating the position of a tag portion 607, and a signature pointer 605 is a pointer indicating the position of a signature 608.

The data portion 606 stores, for example, data produced by encrypting node keys to be updated. For example, the data portion 606 stores the encryption keys, as shown in FIG. 15, concerning the updated node keys.

The tag portion 607 includes tags indicating the positional relationship among the encrypted node keys and leaf key stored in the data portion 606. A rule of attaching the tags will be described with reference to FIG. 18.

Figure 17:
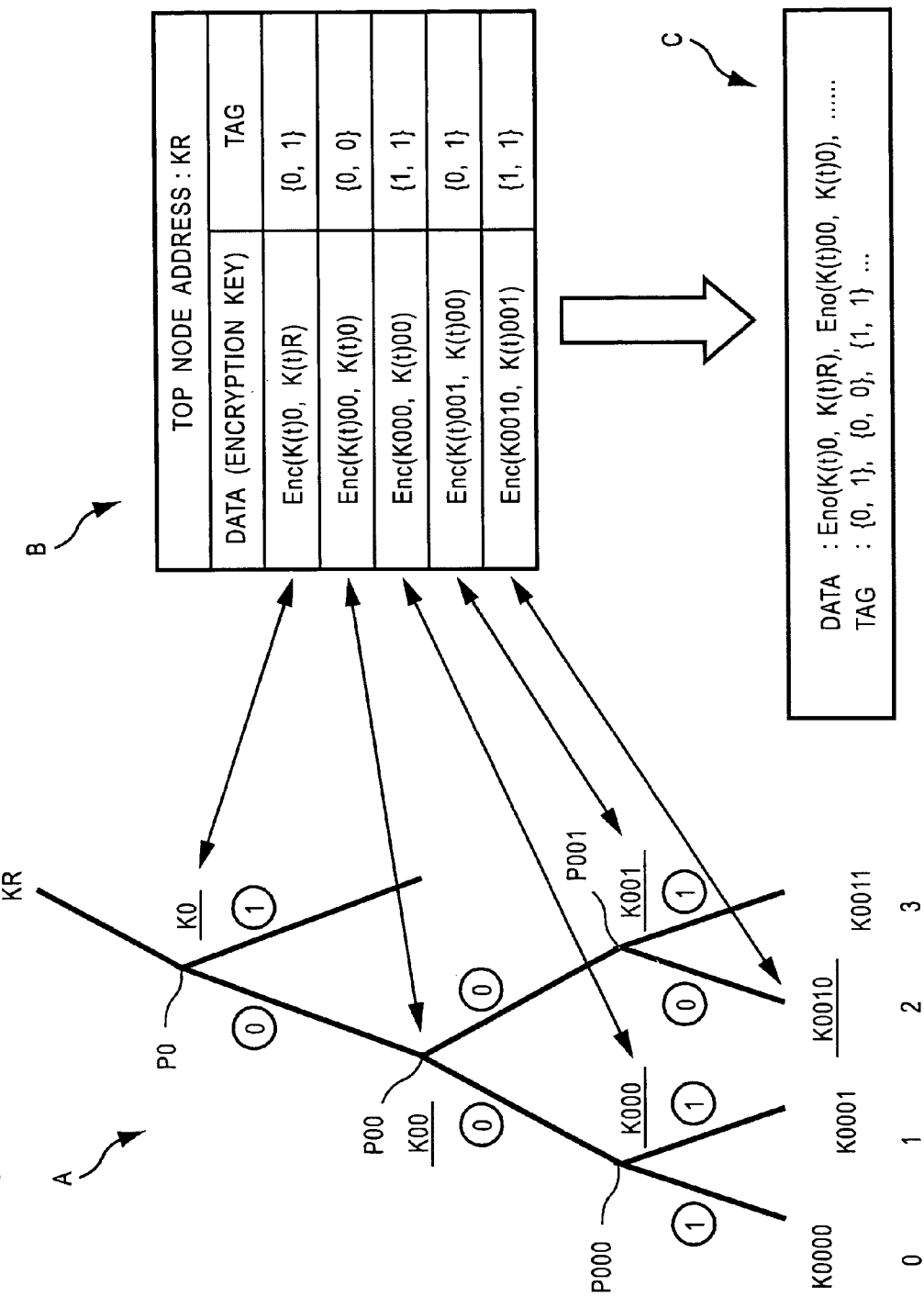
FIG. 17 is a diagram describing the structure of each tag in the enabling key block.

In FIG. 17, an example is shown in which data which is the enabling key block (EKB) illustrated in FIG. 13 is transmitted. The data in this case is arranged as shown in the table of FIG. 17B. The address of a top node included in the encryption keys is referred to as the top node address. Since the data includes the updated root key K(t)R in this example, the top node address is KR. For example, the data at the top level Enc(K(t)0, K(t)R) is associated with the position P0 shown in the hierarchical tree shown in FIG. 17A. Data at the subsequent level is Enc(K(t)00, K(t)0) associated with the position P00 in the lower left of the previous data in the tree. When there is data positioned below a predetermined position in the tree structure, the tag is set to 0. Otherwise, the tag is set to 1. The tag is set as {left (L) tag, right (R) tag}. Since there is data at the position P00 in the lower left of the position P0 associated with the data at the top level Enc(K(t)0, K(t)R) in Table B, L tag=0. Since there is no data on the right, R tag=1. In this manner, all pieces of data are tagged, thus forming a data sequence and a tag sequence shown in FIG. 17C.

The tag is attached indicating the position of the corresponding data Enc(Kxxx, Kyyy) in the tree structure. Pieces of key data Enc(Kxxx, Kyyy)... stored in the data portion 66 are simply a series of pieces of encrypted key data. When the key data is tagged as described above, the position in the tree of each encryption key stored as the data becomes detectable. Instead of tagging the data, as shown in FIG. 15, the data structure may be defined by, for example, the following node indices associated with the encrypted data:

0: Enc(K(t)0, K(t)R)
00: Enc(K(t00, K(t)0)
000: Enc(K((t)000, K(t)00)

When the structure is defined using such indices, the indices are redundant data, and the amount of data increases, which is not desirable in distribution via a network or the like. In contrast, when the above-described tags are used as index data indicating the positions of the keys, the positions of the keys become detectable with a smaller amount of data.

Referring back to FIG. 16, the EKB format will be described in further detail. The signature 608 is a digital signature created by, for example, a key management center (license server 4), a content provider (content server 3), a payment institute (billing server 5), etc., which has issued the enabling key block (EKB). A device having received the EKB verifies the signature included in the EKB to determine whether the obtained enabling key block (EKB) is issued by an authenticate enabling key block (EKB) issuer.

Figure 18:
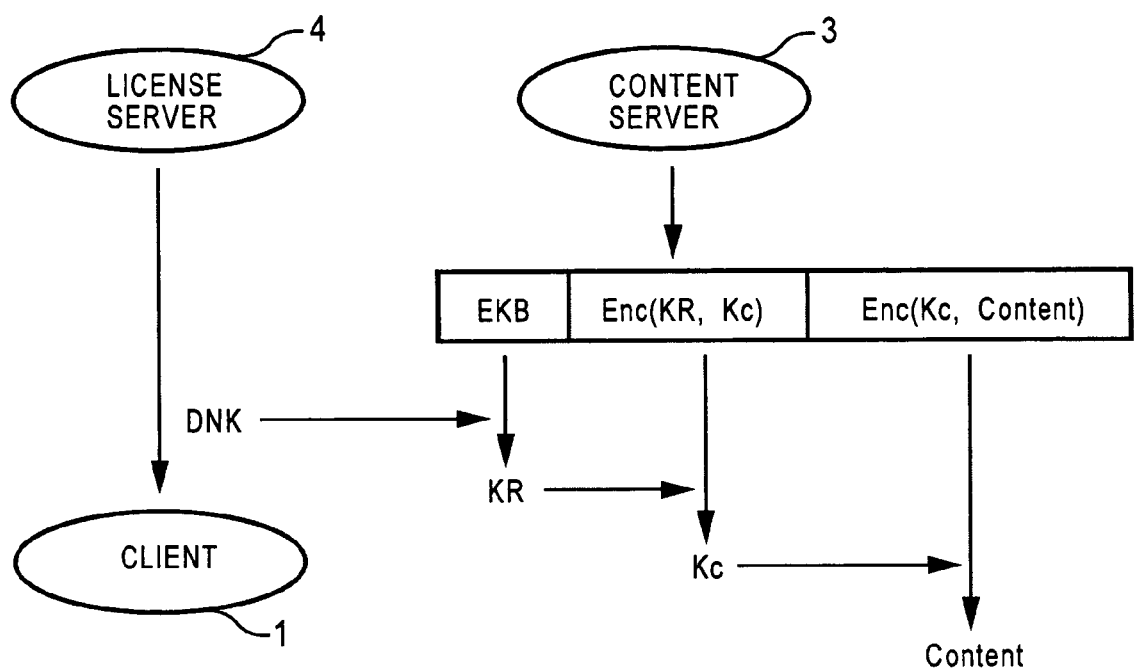
FIG. 18 is a diagram describing a content decrypting process using a DNK.

The above-described process of using content supplied by the content server 3 on the basis of a usage right supplied by the license server 4 is summarized in FIG. 18.

Specifically, content is supplied by the content server 3 to the client 1, and a license is given by the license server 4 to the client 1. A set of service data supplied at the time of registration of the client 1 in the license server 4 and a usage right, which is information for permitting the use of particular content, is referred to as a license. Content is encrypted by a content key Kc (Enc(Kc, Content)). The content key Kc is encrypted by an updated root key KR' (key obtainable from an EKB; associated with $K_{EKBC}$ in FIG. 5) (Enc(KR', Kc)). Along with the EKB, the encrypted content key Kc (Enc(KR', Kc)) is added to the encrypted content and provided to the client 1.

Figure 19:
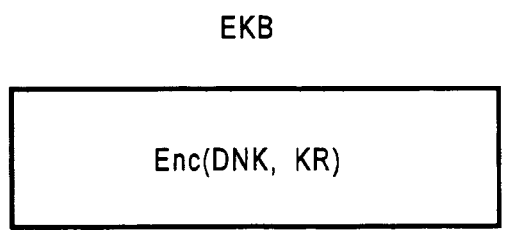
FIG. 19 is an illustration showing an example of an enabling key block.

The EKB in the example shown in FIG. 18 includes, for example, as shown in FIG. 19, the updated root key KR', which can be decrypted by a DNK (Enc(DNK, KR')). Using the DNK included in the service data, the client 1 obtains the updated root key KR' from the EKB. Using the updated root key KR', the client 1 decrypts Enc(KR', Kc) to obtain the content key Kc. Using the content key Kc, the client 1 decrypts Enc(Kc, Content) to obtain the content.

By allocating a DNK to each device, the individual clients 1 can be revoked in accordance with the principle described with reference to FIGS. 10 and 15.

By adding and distributing the license leaf ID to each client 1, each client 1 detects the association between the service data and the usage right. This prevents the making of an unauthorized copy of the usage right.

By distributing each client's certificate and private key as part of the service data, each end user uses the service data including the certificate and private key to create content of which an unauthorized copy is prevented.

According to the present invention, as described with reference to FIG. 11, the T system, which manages licenses, and categories of devices using various types of content are associated with category nodes. This enables one device to hold a plurality of DNKs. As a result, one device can manage plural pieces of content belonging to different categories.

Figure 20:
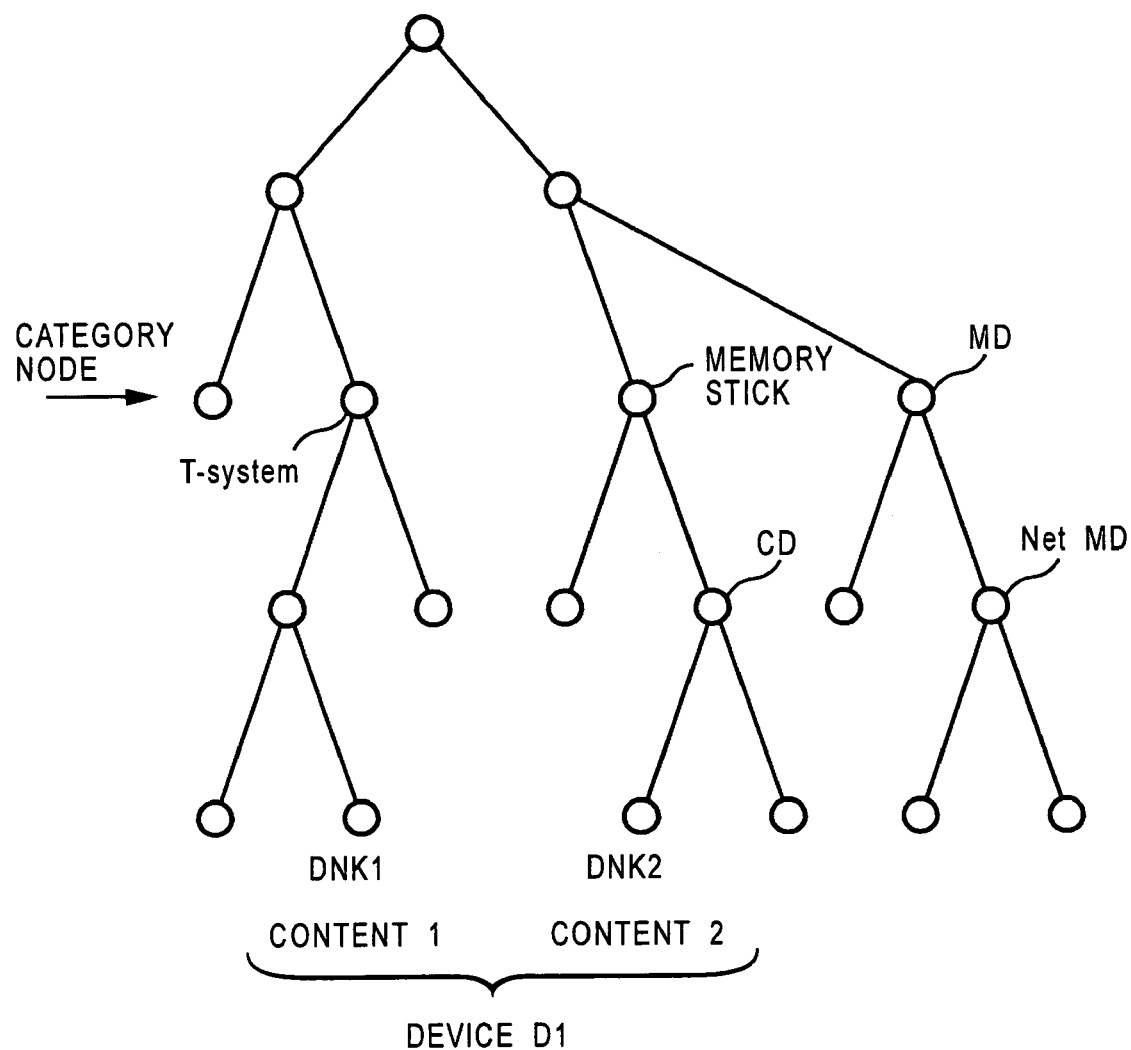
FIG. 20 is a diagram describing the allocation of a plurality of pieces of content to a device.

FIG. 20 shows an example of this relationship. Specifically, DNK 1 is allocated to device D1 on the basis of the T system. As a result, device D1 can play content 1 including an EKB. Similarly, for example, DNK2 is allocated to device D1. As a result, device D1 can record content 2 ripped from a CD onto a memory stick. In this case, device D1 can handle both content 1 and content 2, which are distributed by different systems (T system and a device management system). On the other hand, when only one DNK is allocated to each device in a manner such that an old DNK that has been allocated to the device is deleted to allocate a new DNK, such handling cannot be achieved.

According to the present invention, key management independent in each category is thus made possible.

Instead of embedding a DNK beforehand in each device or medium, a DNK is downloaded from the license server 4 to each device or medium at the time of registration. Accordingly, a system that enables a user to purchase a key is achieved.

In a system that separately distributes content and a usage right for the content, it is preferable that the content, after being created, be usable for all purposes irrespective of usage, no matter what the usage may be. For example, it is preferable that the same content be usable in different content distribution services or for different purposes. According to the present invention, as described above, the license server 4 serving as a certifying authority distributes private keys and certificates for public keys associated with the private keys to individual users (clients 1). Each user uses the private key to create a signature and adds the signature to content to prove the integrity of the content and to prevent unauthorized alteration of the content.

A process of checking out content from the client 1 to a memory stick (trademark), which is placed on the client 1, which is a secure medium, and which is an example of a content storage device, will be described.

Figure 21:
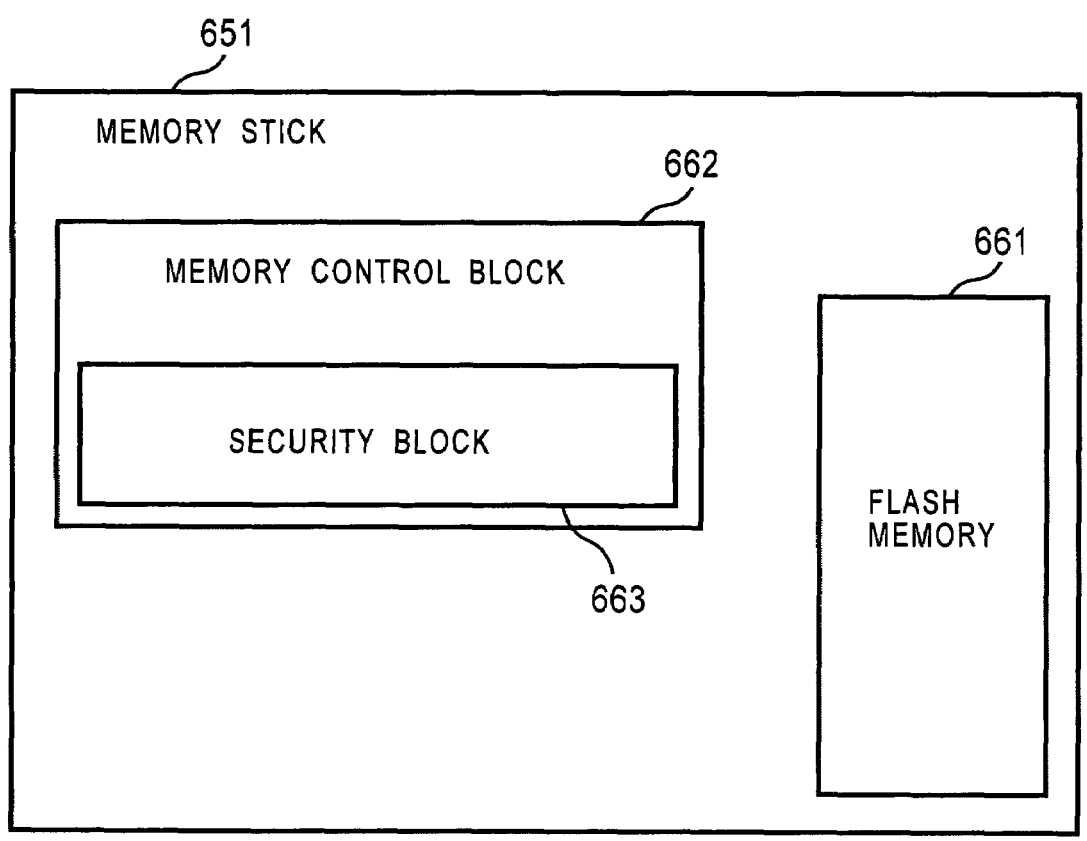
FIG. 21 is a diagram showing the structure of a memory stick.

FIG. 21 is an illustration showing the structure of a memory stick. A memory stick 651 includes a flash memory (non-volatile memory) 661, a memory control block 662, and a security block 663 including a DES (Data Encryption Standard) encryption circuit, which are packed in an IC chip.

The flash memory 661 stores content encoded and encrypted under the control of the memory control block 662.

The memory control block 662 performs serial/parallel conversion or parallel/serial conversion, separates a supplied command and data, and executes the separated command. In accordance with the supplied command, the memory control block 662 stores content on the flash memory 661 or reads content stored on the flash memory 661.

The security block 663 of the memory stick 651 stores a plurality of authentication keys and a storage key unique to each memory card. The security block 663 has a random number generating circuit, performs mutual authentication with the client 1 under the control of the memory control block 662, and shares a session key with the client 1.

The security block 663 stores an index including a usage rule and a MAC value, which will be described below.

The security block 663 decrypts encrypted content under the control of the memory control block 662.

Figure 22:
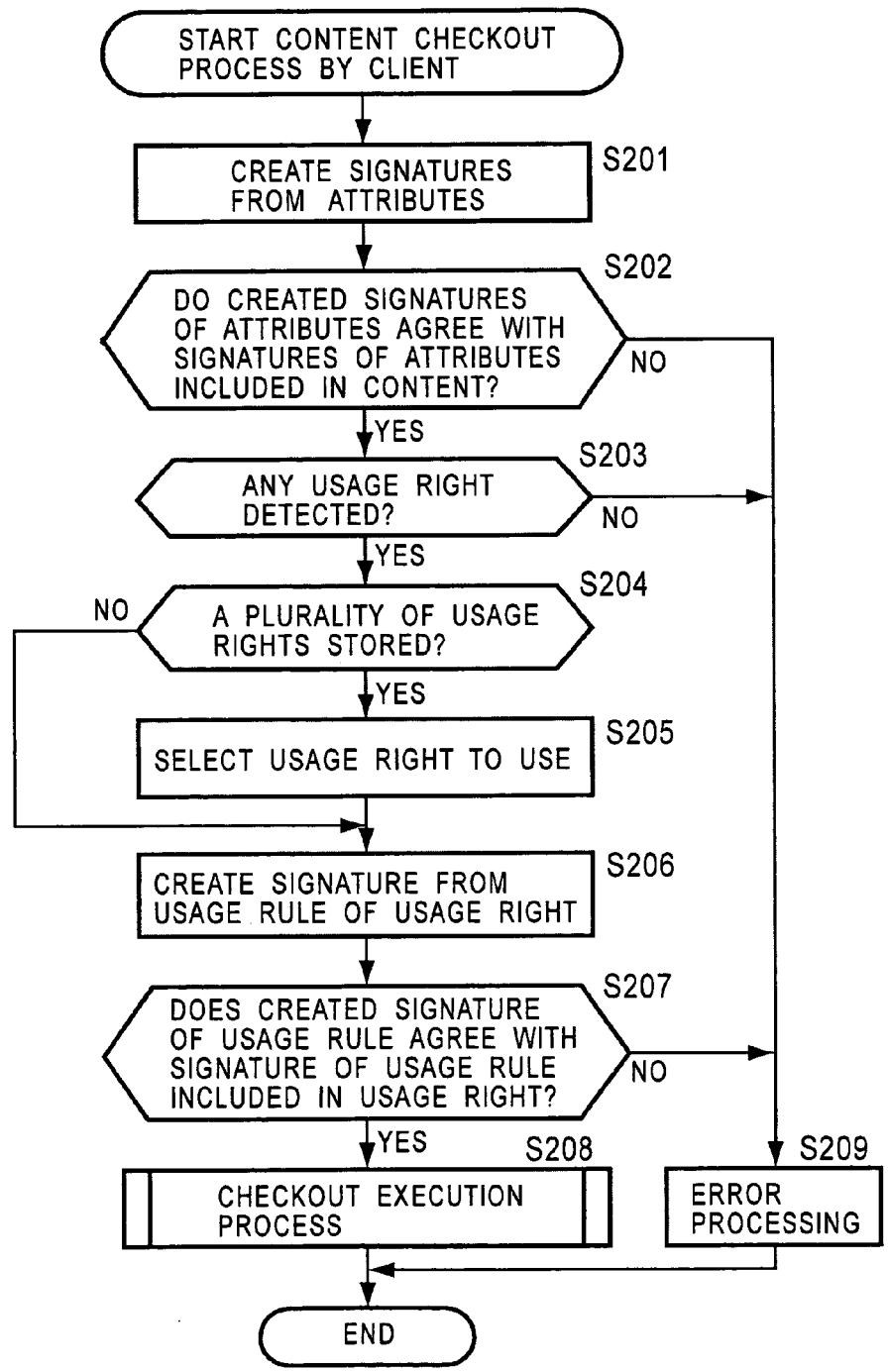
FIG. 22 is a flowchart describing a content checkout process.

FIG. 22 is a flowchart describing a content checkout process by the client 1.

In step S201, the CPU 21 of the client 1 selects content to be checked out and creates signatures from attributes included in the selected content.

For example, the CPU 21 of the client 1 creates signatures by encrypting attributes included in the content by the public key of the license server, the public key being included in the certificate.

In step S202, the CPU 21 of the client 1 compares the created signatures of the attributes with signatures of the attributes included in the content. When it is determined that the created signatures of the attributes agree with the signatures of the attributes included in the content, it is determined that the attributes are unaltered. The process proceeds to step S203.

When it is determined in step S202 that the created signatures of the attributes disagree with the signatures of the attributes included in the content, it is determined that the attributes are altered. In step S209, the CPU 21 of the client 1 performs the error processing, such as displaying an error message. The CPU 21 does not execute checkout, and the process is terminated.

In step S203, the CPU 21 of the client 1 searches the storage unit 28 for a storage right whose content rules included therein are satisfied by the attributes of the target content, thus permitting checkout. When such a usage right for using the target content is not detected in the storage unit 28, in step S209, the CPU 21 of the client 1 performs the error processing, such as displaying an error message. The CPU 21 does not execute checkout, and the process is terminated.

When the usage right for using the content is detected, in step S204, the CPU 21 of the client 1 determines whether one or a plurality of usage rights for using the content are stored in the storage unit 28.

When it is determined that a plurality of usage rights for using the target content are stored in the storage unit 28, in step S205, the CPU 21 of the client 1 displays information, such as a usage rule of each usage right, on the display of the output unit 27 and instructs the user to determine which usage right's usage rule serves as a usage rule of the content to be checked out. On the basis of data input by the user to the input unit 26, it is determined which usage right is to be used to check out the content.

Instead of selecting the usage right in step S205 by the user, the usage rights may be prioritized on the basis of a predetermined rule.

When it is determined that one usage right for using the target content is stored in the storage unit 28, it means that the usage right to be used to check out the content is determined. Therefore, the selection of the usage right is not performed in step S205. The process proceeds to step S206.

After the usage right for using the content is selected, in step S206, the CPU 21 of the client 1 creates a signature from a usage rule of the usage right.

For example, the CPU 21 of the client 1 creates a signature by encrypting a usage rule included in the usage right by the public key of the license server, the public key being included in the license.

In step S207, the CPU 21 of the client 1 compares the created signature of the usage rule with a signature of the usage rule included in the usage right. When it is determined that the created signature of the usage rule agrees with the signature of the usage rule included in the usage right, it is determined that the usage rule is unaltered. The process proceeds to step S208. In step S208, the CPU 21 of the client 1 executes checkout. The process is terminated.

When it is determined in step S207 that the created signatures of the attributes disagree with the signatures of the attributes included in the content, it is determined that the attributes are altered. In step S209, the CPU 21 of the client 1 performs the error processing, such as displaying an error message. The CPU 21 does not execute checkout. The process is terminated.

Figure 23:
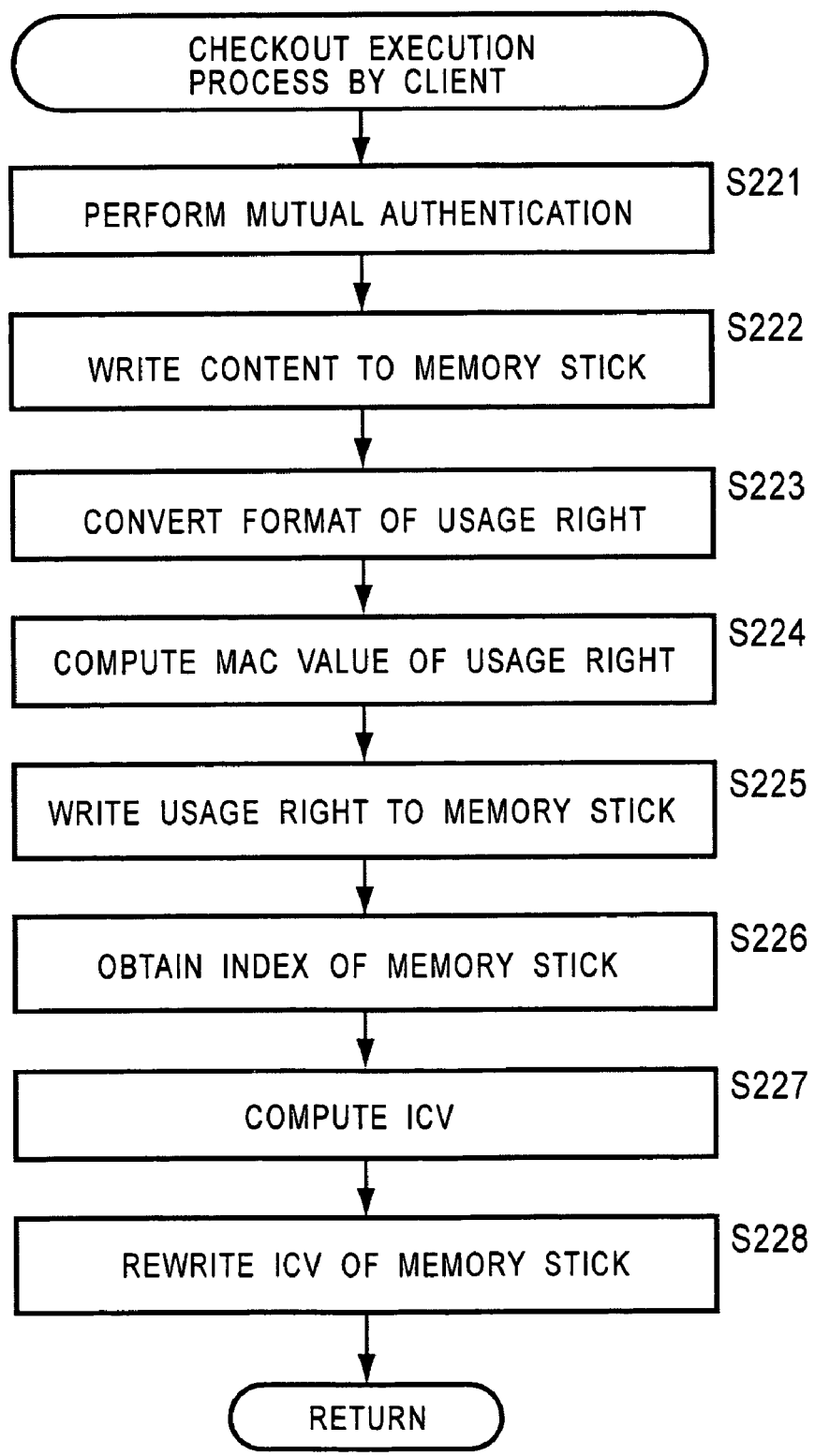
FIG. 23 is a flowchart describing a checkout execution process by the client.

FIG. 23 is a flowchart describing a checkout execution process by the client 1, which is associated with the processing in step S208.

In step S221, the CPU 21 of the client 1 performs mutual authentication with the memory stick placed on the client 1. For example, the CPU 21 of the client 1 and the security block 663 of the memory stick 651 perform challenge-and-response mutual authentication.

When mutual authentication by the processing in step S221 has failed, it means that the client 1 or the memory stick 651 is not authenticate. The processing from steps S222 to S228 is skipped. The content is not written to the memory stick 651. The process is terminated.

When mutual authentication by the processing in step S221 has succeeded, it means that the client 1 and the memory stick 651 are authenticate. The client 1 and the memory stick 651 share a common temporary key (session key). The processing from steps S222 to S228 is performed.

In the processing from this point onward in which the common temporary key (session key) is shared, information transmitted by the client 1 to the memory stick 651 is encrypted by the encryption/decryption unit 24 using the temporary key. Since information received by the client 1 from the memory stick 651 is encrypted by the temporary key, the information is decrypted by the encryption/decryption unit 24.

In step S222, the CPU 21 of the client 1 writes the content to the memory stick 651. For example, the CPU 21 of the client 1 obtains a content key of the memory stick 651 from the memory stick 651, relocks the content (encrypts the content by the content key of the memory stick 651), and supplies the content relocked by the content key of the memory stick 651 to the memory stick 651.

Alternatively, the memory stick 651 may relock the content.

In step S223, the CPU 21 of the client 1 converts the format of the usage rule of the usage right into a format associated with the memory stick.

In step S224, the CPU 21 of the client 1 causes the encryption/decryption unit 24 to compute a message authentication code (MAC) (hereinafter may also be referred to as a MAC value) of the usage rule of the usage right.

Figure 24:
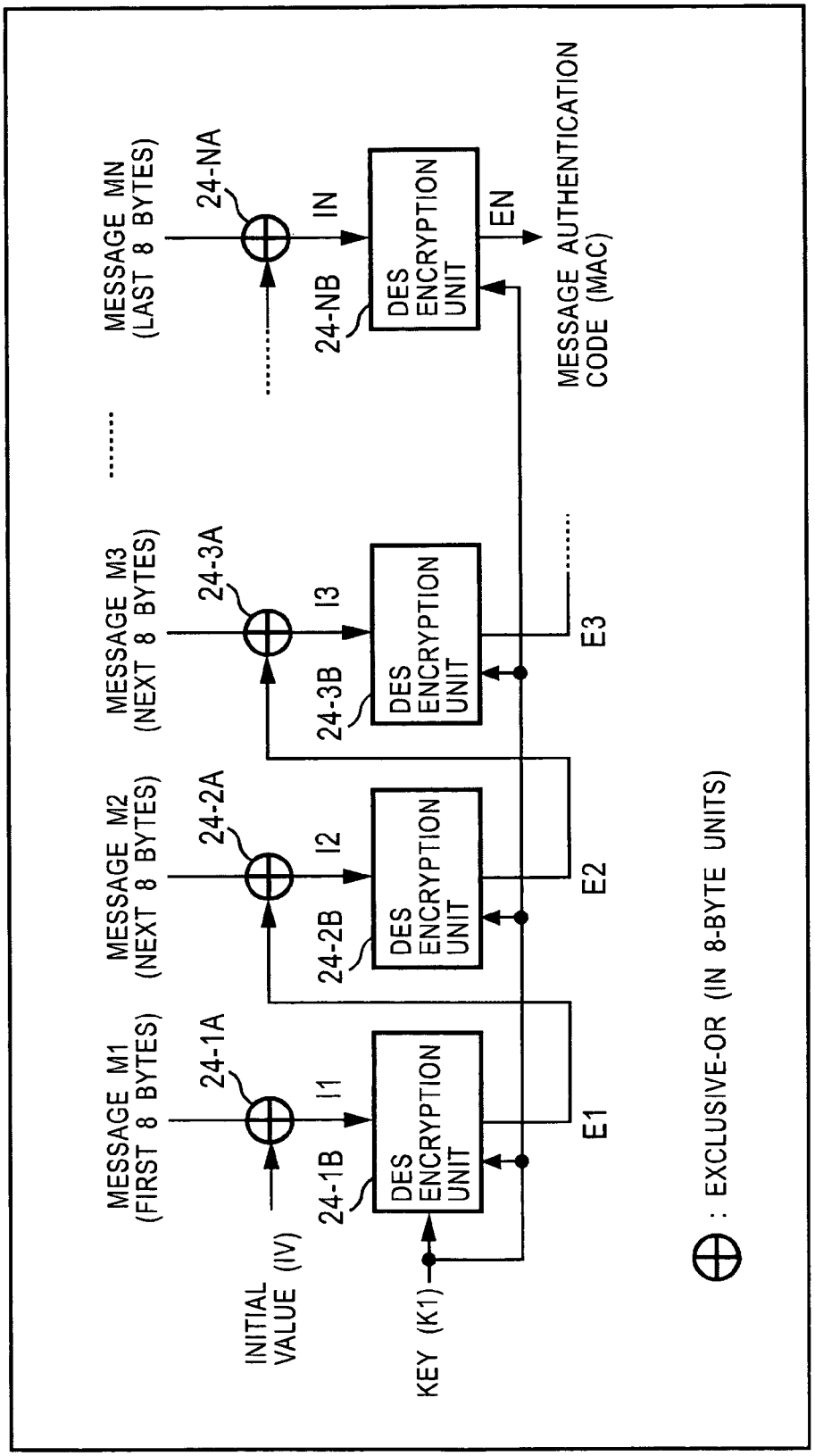
FIG. 24 is a diagram showing an example of generation of a MAC value using a DES encryption algorithm.

FIG. 24 shows an example of generation of a MAC value using a DES encryption algorithm. As shown by the algorithm of FIG. 24, a target message (usage rule) is divided in units of eight bytes (hereinafter segments of messages are represented by M1, M2, . . . , MN). First, the exclusive OR of an initial value (IV) and M1 is computed by an arithmetic operation unit 24-1A (the result is represented by 11). Next, I1 is input to a DES encryption unit 24-1B and encrypted using a key (hereinafter referred to as K1) (output is represented by E1). The exclusive OR of E1 and M2 is computed by an arithmetic operation unit 24-2A. The output 12 of the arithmetic operation unit 24-2A is input to a DES encryption unit 24-2B and encrypted using the key K1 (output E2). The processing is repeated to encrypt the entire message. The last output EN from a DES encryption unit 24-NB serves as the message authentication code (MAC).

In step S225, the CPU 21 of the client 1 writes the usage rule whose format has been converted by the processing in step S223 to an index of the memory stick 651, along with the MAC value computed by the processing in step S224.

Figure 25:
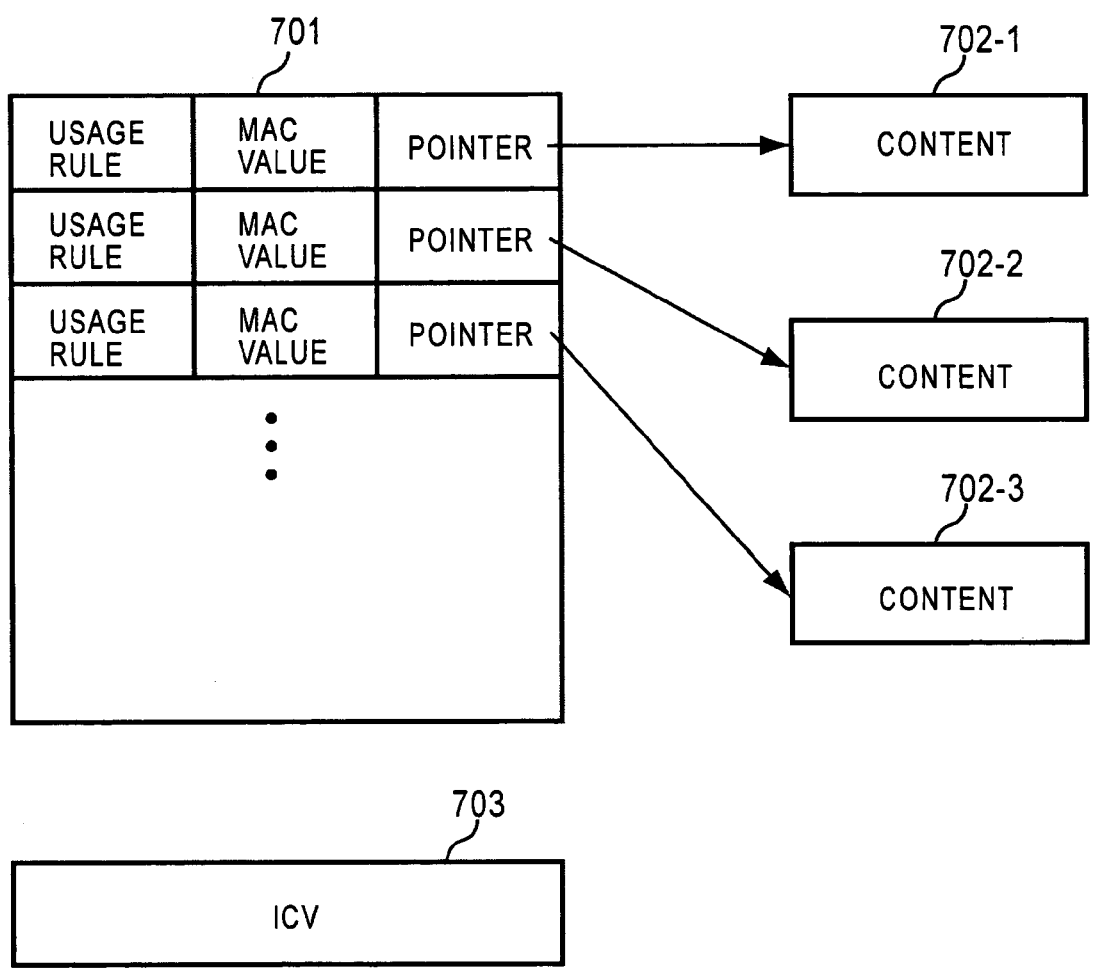
FIG. 25 is a diagram describing an index and content stored on the memory stick.

FIG. 25 is a diagram describing an index and content stored in the memory stick 651.

An index 701 of the memory stick 651 stores, in association with each piece of content, a usage rule, a MAC value, and a pointer of the content. Each pointer in the index 701 stores the address of the content.

For example, a pointer indicating content 702-1 stored in the memory stick 651 is stored in the index 701, along with a usage rule of the content 702-1 and a MAC value associated with the usage rule. A pointer indicating content 702-2 stored in the memory stick 651 is stored in the index 701, along with a usage rule of the content 702-2 and a MAC value associated with the usage rule. A pointer indicating content 702-3 stored in the memory stick 651 is stored in the index 701, along with a usage rule of the content 702-3 and a MAC value associated with the usage rule.

In step S226, the CPU 21 of the client 1 obtains, from the memory stick 651, the index 701 including the new usage rule and MAC value, which are written by the processing in step S225.

In step S227, the CPU 21 of the client 1 computes an integrity check value (ICV) of the overall memory stick 651 on the basis of the index 701 including the new usage rule and MAC value.

The integrity check value of the index 701 is computed by, for example, a hash function of the index 701: ICV=hash (Kicv, R1, R2, . . . ) where Kicv is an ICV generation key and L1 and L2 are usage rule information consisting of the MAC values of the usage rules.

In step S228, the CPU 21 of the client 1 rewrites the integrity check value of the memory stick 651 to the computed integrity check value. The process is terminated.

For example, the CPU 21 of the client 1 computes the integrity check value on the basis of the MAC values associated with the content 702-1 to 702-3, which are included in the index 701 obtained from the memory stick 651.

The CPU 21 of the client 1 writes, as shown in FIG. 25, a computed integrity check value 703 to the memory stick 651.

The client 1 encrypts the integrity check value by the temporary key and transmits the encrypted integrity check value to the memory stick 651 via a so-called SAC (Secure Authentication Channel).

Accordingly, the memory stick stores the integrity check value 703 associated with the index 701 in a secure manner.

For example, when the result of comparison of an ICV generated on the basis of the index 701 at the time the content is played with the ICV 703 generated on the basis of the usage rule shows that the two ICVs are the same, it is ensured that the usage rule is unaltered. When the ICVs disagree with each other, it is determined that the usage rule is altered.

Figure 26:
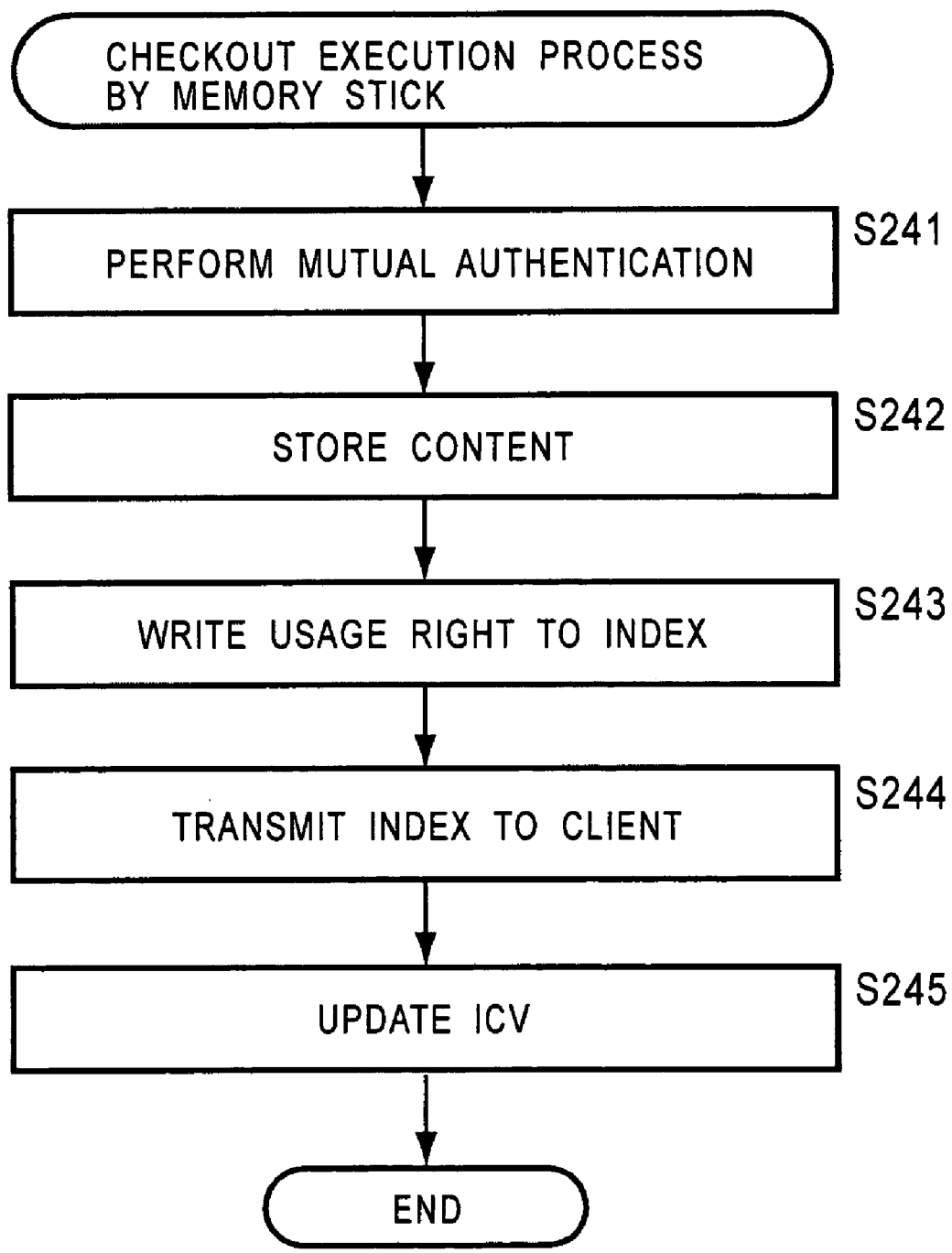
FIG. 26 is a flowchart describing a checkout execution process by the memory stick.

With reference to a flowchart of FIG. 26, a checkout execution process by the memory stick 651, which is associated with the checkout execution process by the client 1, which is shown in FIG. 23, will now be described.

In step S241, the security block 663 of the memory stick 651 performs mutual authentication with the client 1 in association with the processing of S221 by the client 1.

When mutual authentication has succeeded, the client 1 and the memory stick 651 share a common temporary key (session key).

In the processing from this point onward in which the common temporary key (session key) is shared, information transmitted by the memory stick 651 to the client 1 is encrypted by the security block 663 using the temporary key. Since information received by the memory stick 651 from the client 1 is encrypted by the temporary key, the security block 663 of the memory stick 651 decrypts the encrypted information.

In step S242, since the content client 1 performs the processing in step S222 to transmit the content, the memory control block 662 of the memory stick 651 receives the content and stores the content in the flash memory 661.

In step S243, since the client 1 performs the processing in step S225 to transmit the usage rule whose format has been converted, the memory control block 662 of the memory stick 651 receives the usage rule and writes the received usage rule to the index 701 of the security block 663. In association with the usage rule, the memory stick 651 writes a pointer indicating the content stored by the processing in step S242 to the index 701 of the security block 663.

By the processing in step S243, as shown in FIG. 25, the index 701 of the security block 663 stores the usage rule associated with the newly stored content, the MAC value, and the pointer indicating the content.

In step S244, in response to the request from the client 1, the memory control block 662 of the memory stick 651 reads the index 701 from the security block 663 and transmits the read index 701 to the client. Upon reception of the index 701 transmitted by the processing in step S244, the client 1 obtains the index 701 by the processing in step S226.

In step S245, since the client 1 performs the processing in step S228 to transmit a new ICV, the memory stick 651 receives the ICV transmitted by the client 1 and updates the ICV on the basis of the received ICV. The process is terminated.

In this manner, the signature generated by encryption using the public key, which is integrity information, is added to the content. Integrity information, which is a hash value based on a common key cryptosystem, is generated by the client and added to the usage rule on the data storage medium. The integrity information on the content and the integrity information on the usage rule are combined as one piece of information and managed as part of the index 701.

Even when the throughput of the memory stick is low, the client 1 can check out the content with the signature based on the common key cryptosystem to the memory stick without reducing the level of protection of the content.

The same content can be used even by a low-throughput terminal. Accordingly, all devices can exchange content.

Specifically, when content is written to a memory stick, the content can be stored on the memory stick.

In a case in which the writing of content with a digital signature is controlled, a usage rule of a necessary usage right for using the content is converted to a format associated with a content storage device, usage rule alteration detecting data for detecting alteration of the format-converted usage right is generated, and the writing of the format-converted usage rule and the usage rule alteration detecting data is controlled, even a low-throughput memory stick can use the content, and unauthorized use of the content is reliably prevented.

When a memory for storing the content is provided, the content can be stored.

In a case in which storage of content with a digital signature, which is provided by an information processing apparatus, is controlled, and storage of a usage rule and usage rule alteration detecting data for detecting alteration of the usage rule, which are supplied by the information processing apparatus, is controlled, even a low-throughput device can use the content, and unauthorized use of the content is reliably prevented.

In a case in which content to be stored on a memory stick serving as a content storage device is selected, a first digital signature added to the selected content is verified, a usage right for permitting use of the selected content is stored, the usage right associated with the selected content is retrieved from the storage unit 28, a second digital signature added to the retrieved usage right is verified, alteration detecting data is generated on the basis of information included in the retrieved usage right, and, when it is determined that the content and the usage right are unaltered on the basis of the first verification result and the second verification result, the usage right, the alteration detecting data, and the content are output to the content storage device, even a low-throughput memory stick can use the content, and unauthorized use of the content is reliably prevented.

Although an example in which content is checked out from the client to the memory stick has been described, the content may be copied from the client to the memory stick, or the content may be transferred from the client to the memory stick.

Although an example in which content is checked out from the client to the memory stick has been described, the content may be checked out, transferred, or copied from the client to a PD, which is another example of a content storage device.

The content may be checked out, transferred, or copied from the client to a memory stick placed on a PD. In this case, mutual authentication is performed between the client and the PD and between the PD and the memory stick.

Clients to which the present invention is applicable include, in addition to so-called personal computers, PDAs (Personal Digital Assistants), cellular phones, game terminals, and the like.

To perform a series of processes by software, a program constituting the software is installed via a network or a recording medium into a computer included in dedicated hardware or, for example, a general-purpose personal computer capable of performing various functions by installing various programs into the personal computer.

The recording medium includes, as shown in FIG. 2, not only a packaged medium distributed to provide a program to the user, separately from an apparatus, the packaged medium including the magnetic disk 41 (including a flexible disk), the optical disk 42 (including a CD-ROM (Compact Disk-Read Only Memory) and a DVD (Digital Versatile Disk)), the magneto-optical disk 43 (including an MD (Mini-Disk) (trademark)), or the semiconductor memory 44 having the program recorded thereon, but also the ROM 22 having the program recorded thereon or the hard disk included in the storage unit 28 provided to the user by being included in advance in the apparatus.

In the present description, steps for writing a program recorded on the recording medium include not only time-series processes performed in accordance with the described order, but also parallel or individual processes, which may not necessarily be performed in time series.

Preferably, a program for performing a security-related process is encrypted to prevent the process from being analyzed. For example, a program for performing an encryption process may be implemented as a tamper-resistant module.

In the above-described embodiment, attributes of content and content rules of a usage right are used to specify the necessary usage right for using the content. However, the necessary information for specifying the usage right is not limited to these pieces of information. For example, content may include the usage right ID of the necessary usage right for using the content. In this case, when content is specified, the necessary usage right for using the content is uniquely determined. It thus becomes unnecessary to perform a process of determining the matching between content and a usage right.

INDUSTRIAL APPLICABILITY

As described above, according to the present invention, content can be stored on a content storage device.

According to the present invention, content can be used even by a low-throughput content storage device, and unauthorized use of content is reliably prevented.

The invention claimed is:

1. An information processing apparatus that permits use of content on the basis of a usage right associated with the content, comprising:

first selection means for selecting content to be stored on a content storage device;

first verification means for verifying a first digital signature added to the content selected by the first selection means;

storage means for storing a usage right permitting use of the content selected by the first selection means, wherein the usage right includes at least one of usage rules, an expiration date and a digital signature;

retrieving means for retrieving, from the storage means, the usage right associated with the content selected by the first selection means;

second verification means for verifying a second digital signature added to the usage right retrieved by the retrieving means;

first data generating means for generating first alteration detecting data on the basis of information included in the usage right retrieved by the retrieving means; and first output means for outputting the usage right, the first alteration detecting data generated by the first data generating means, and the content to the content storage device upon determination that, on the basis of the verification result by the first verification means and the verification result by the second verification means, the content and the usage right are unaltered.

2. The information processing apparatus according to claim 1, further comprising second selection means for selecting, when a plurality of usage rights are retrieved by the retrieving means, a usage right from among the plurality of retrieved usage rights, wherein the second verification means verifies a digital signature added to the usage right selected by the second selection means, and the first data generating means generates the first alteration detecting data on the basis of information included in the usage right selected by the second selection means.

3. The information processing apparatus according to claim 1, further comprising conversion means for converting the content selected by the first selection means to a format associated with the content storage device, wherein the first output means outputs the content converted by the conversion means to the content storage device.

4. The information processing apparatus according to claim 1, further comprising conversion means for converting the usage right associated with the content to a format associated with the content storage device, wherein the first alteration detecting data generated by the first data generating means is alteration detecting data based on the usage right converted by the conversion means.

5. The information processing apparatus according to claim 1, wherein the first alteration detecting data generated by the first data generating means is generated on the basis of a usage rule included in the usage right.

6. The information processing apparatus according to claim 1, further comprising:
   obtaining means for obtaining, from the content storage device, the entire first alteration detecting data generated by the first data generating means on the basis of the usage right associated with the content stored on the content storage device;
   second data generating means for generating second alteration detecting data on the basis of the entire first alteration detecting data obtained by the obtaining means; and
   second output means for outputting the second alteration detecting data generated by the second data generating means to the content storage device.

7. An information processing method for permitting use of content on the basis of a usage right associated with the content, comprising:
   a selection step of selecting content to be stored on a content storage device;
   a first verification step of verifying a first digital signature added to the content selected in the selection step;
   a storage control step of controlling storage of a usage right permitting use of the content selected in the selection step in storage means, wherein the usage right includes at least one of usage rules, an expiration date and a digital signature;
   a retrieving step of retrieving, from the storage means, the usage right associated with the content selected in the selection step;
   a second verification step of verifying a second digital signature added to the usage right retrieved in the retrieving step;
   a data generating step of generating alteration detecting data on the basis of information included in the usage right retrieved in the retrieving step; and
   an output step of outputting the usage right, the alteration detecting data generated in the data generating step, and the content to the content storage device upon determination that, on the basis of the verification result by the first verification step and the verification result by the second verification step, the content and the usage right are unaltered.

8. A program for causing a computer that controls information processing that permits use of content on the basis of a usage right associated with the content to perform a process comprising:
   a selection step of selecting content to be stored on a content storage device;
   a first verification step of verifying a first digital signature added to the content selected in the selection step;
   a storage control step of controlling storage of a usage right permitting use of the content selected in the selection step in storage means, wherein the usage right includes at least one of usage rules, an expiration date and a digital signature;
   a retrieving step of retrieving, from the storage means, the usage right associated with the content selected in the selection step;
   a second verification step of verifying a second digital signature added to the usage right retrieved in the retrieving step;
   a data generating step of generating alteration detecting data on the basis of information included in the usage right retrieved in the retrieving step; and
   an output step of outputting the usage right, the alteration detecting data generated in the data generating step, and the content to the content storage device upon determination that, on the basis of the verification result by the first verification step and the verification result by the second verification step, the content and the usage right are unaltered.

* * * * *